(12) United States Patent
Threlkeld et al.

(10) Patent No.: US 10,277,649 B2
(45) Date of Patent: *Apr. 30, 2019

(54) PRESENTATION OF COMPUTING ENVIRONMENT ON MULTIPLE DEVICES

(71) Applicant: Microsoft Technology Licensing, LLC, Redmond, WA (US)

(72) Inventors: Elizabeth Fay Threlkeld, Redmond, WA (US); William Scott Stauber, Seattle, WA (US); Petteri Mikkola, Bellevue, WA (US); Keri Kruse Moran, Bellevue, WA (US); Issa Y. Khoury, Redmond, WA (US); Giorgio Francesco Sega, Kirkland, WA (US); Mohammed Kaleemur Rahman, Seattle, WA (US); Kenton Allen Shipley, Woodinville, WA (US); Ramrajprabu Balasubramanian, Renton, WA (US); Patrick Derks, Seattle, WA (US); Ryan Chandler Pendlay, Bellevue, WA (US); Darren Ray Davis, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,057

(22) Filed: Sep. 18, 2017

(65) Prior Publication Data

US 2018/0007104 A1   Jan. 4, 2018

Related U.S. Application Data

(63) Continuation of application No. 14/495,420, filed on Sep. 24, 2014, now Pat. No. 9,769,227.

(51) Int. Cl.
*H04L 29/06* (2006.01)
*G06F 9/451* (2018.01)
*G06F 9/54* (2006.01)

(52) U.S. Cl.
CPC .......... *H04L 65/4076* (2013.01); *G06F 9/452* (2018.02); *G06F 9/54* (2013.01); *H04L 65/607* (2013.01); *G06F 2209/549* (2013.01)

(58) Field of Classification Search
CPC . H04L 65/4076; H04L 65/607; G06F 9/4445; G06F 9/452; G06F 9/54; G06F 2209/549
See application file for complete search history.

(56) References Cited

U.S. PATENT DOCUMENTS

| 5,880,732 | A | 3/1999 | Tryding |
| 6,748,195 | B1 | 6/2004 | Phillips |

(Continued)

FOREIGN PATENT DOCUMENTS

| EP | 1942401 A1 | 7/2008 |
| EP | 2000894 A2 | 12/2008 |

(Continued)

OTHER PUBLICATIONS

"Bimodal tablets (Windows and Android)", Retrieved from: http://getwired.com/2014/01/bimodal-tablets-windows-and-android-remember-them-when-theyre-gone-again/, Jan. 14, 2005, 23 Pages.

(Continued)

*Primary Examiner* — Brian J. Gillis
*Assistant Examiner* — Chhian (Amy) Ling
(74) *Attorney, Agent, or Firm* — Newport IP, LLC; Scott Y. Shigeta

(57) ABSTRACT

A user may interact with a collection of devices that each exhibit particular device properties. Where each device executes and presents an isolated computing environment, inconsistencies may arise in the user interaction by the user (Continued)

with different devices. Alternatively, a terminal server may present a computing environment to various auxiliary devices, but such presentation may fail to utilize some device properties of some devices, and/or may present a computing environment that is not suitable for some devices. Instead, a primary device of the device collection may adapt a primary computing environment to an auxiliary computing environment for each auxiliary device, based upon its device properties. Upon receiving a request to execute an application, the primary device may execute the application within the auxiliary computing environment, and may adapt the application based upon the device properties. The primary device may stream each auxiliary computing environment to the respective auxiliary device.

20 Claims, 9 Drawing Sheets

(56) References Cited

U.S. PATENT DOCUMENTS

| | | |
|---|---|---|
| 6,856,960 B1 | 2/2005 | Dragosh et al. |
| 6,941,356 B2 | 9/2005 | Meyerson |
| 6,952,676 B2 | 10/2005 | Sherman |
| 7,345,671 B2 | 3/2008 | Robbin et al. |
| 7,392,193 B2 | 6/2008 | Mault |
| 7,437,183 B2 | 10/2008 | Makinen |
| 7,523,226 B2 | 4/2009 | Anderson et al. |
| 7,574,469 B2 | 8/2009 | Lorencz |
| 7,574,691 B2 | 8/2009 | Freitas et al. |
| 7,716,273 B2 | 5/2010 | Soin et al. |
| 7,840,509 B1 | 11/2010 | Messina |
| 7,937,075 B2 | 5/2011 | Zellner |
| 7,962,552 B2 | 6/2011 | Clark et al. |
| 8,041,296 B2 | 10/2011 | Skog et al. |
| 8,150,945 B2 | 4/2012 | Karaoguz et al. |
| 8,161,403 B2 | 4/2012 | Lyle et al. |
| 8,185,539 B1 | 5/2012 | Bhardwaj |
| 8,194,037 B2 | 6/2012 | Kerr et al. |
| 8,244,288 B2 | 8/2012 | Chipchase |
| 8,354,997 B2 | 1/2013 | Boillot |
| 8,418,072 B1 | 4/2013 | Bauer et al. |
| 8,453,186 B2 | 5/2013 | Roberts et al. |
| 8,462,896 B2 | 6/2013 | Suga et al. |
| 8,504,936 B2 | 8/2013 | Gimpl et al. |
| 8,520,000 B2 | 8/2013 | Duncker et al. |
| 8,520,810 B1 | 8/2013 | Reding et al. |
| 8,538,324 B2 | 9/2013 | Hardacker et al. |
| 8,538,401 B2 | 9/2013 | Kim et al. |
| 8,549,425 B2 | 10/2013 | Sakamoto |
| 8,711,552 B2 | 4/2014 | Medica et al. |
| 8,736,762 B2 | 5/2014 | Luo et al. |
| 8,762,896 B2 | 6/2014 | Lee et al. |
| 9,081,498 B2 | 7/2015 | Thorsander et al. |
| 9,357,250 B1 | 5/2016 | Newman et al. |
| 9,395,905 B2 | 7/2016 | Wherry |
| 9,405,459 B2 | 8/2016 | Sirpal et al. |
| 9,448,811 B2 | 9/2016 | Culshaw et al. |
| 9,678,640 B2 | 6/2017 | Stauber et al. |
| 9,721,570 B1 | 8/2017 | Beal et al. |
| 9,860,306 B2 | 1/2018 | Threlkeld et al. |
| 9,912,724 B2 | 3/2018 | Liu et al. |
| 10,025,684 B2 | 7/2018 | Khoury et al. |
| 2002/0054141 A1 | 5/2002 | Yen et al. |
| 2002/0161891 A1 | 10/2002 | Higuchi et al. |
| 2003/0036927 A1 | 2/2003 | Bowen |
| 2003/0055735 A1 | 3/2003 | Cameron et al. |
| 2003/0055738 A1 | 3/2003 | Alie |
| 2003/0164818 A1 | 9/2003 | Miller-smith |
| 2003/0189597 A1 | 10/2003 | Anderson et al. |
| 2003/0214458 A1 | 11/2003 | Giemborek et al. |
| 2004/0002049 A1 | 1/2004 | Beavers et al. |
| 2006/0203758 A1 | 9/2006 | Tee et al. |
| 2006/0236255 A1 | 10/2006 | Lindsay et al. |
| 2007/0083911 A1 | 4/2007 | Madden et al. |
| 2007/0113190 A1 | 5/2007 | Clark et al. |
| 2007/0236475 A1 | 10/2007 | Wherry |
| 2007/0299796 A1 | 12/2007 | Macbeth et al. |
| 2008/0005693 A1 | 1/2008 | Oliver et al. |
| 2008/0036743 A1 | 2/2008 | Westerman et al. |
| 2008/0084400 A1 | 4/2008 | Rosenberg |
| 2008/0226119 A1 | 9/2008 | Candelore et al. |
| 2008/0248834 A1 | 10/2008 | Chatterjee et al. |
| 2008/0250424 A1 | 10/2008 | Brugiolo et al. |
| 2008/0305742 A1 | 12/2008 | Basir |
| 2008/0305743 A1 | 12/2008 | Aithal et al. |
| 2009/0037832 A1 | 2/2009 | Falchuk et al. |
| 2009/0113346 A1 | 4/2009 | Wickramasuriya et al. |
| 2009/0153288 A1 | 6/2009 | Hope et al. |
| 2009/0207097 A1 | 8/2009 | Sherman et al. |
| 2009/0210481 A1 | 8/2009 | Fletcher et al. |
| 2009/0231271 A1 | 9/2009 | Heubel et al. |
| 2009/0322693 A1 | 12/2009 | Sasakura |
| 2010/0060588 A1 | 3/2010 | Fong |
| 2010/0064228 A1 | 3/2010 | Tsern |
| 2010/0088100 A1 | 4/2010 | Lindahl |
| 2010/0138780 A1 | 6/2010 | Marano et al. |
| 2010/0211636 A1 | 8/2010 | Starkenburg et al. |
| 2010/0299436 A1 | 11/2010 | Khalid et al. |
| 2010/0304783 A1 | 12/2010 | Logan et al. |
| 2011/0024691 A1 | 2/2011 | French et al. |
| 2011/0033971 A1 | 2/2011 | Koo et al. |
| 2011/0055774 A1 | 3/2011 | Kim et al. |
| 2011/0066971 A1 | 3/2011 | Forutanpour et al. |
| 2011/0126119 A1 | 5/2011 | Young et al. |
| 2011/0130178 A1 | 6/2011 | Shin et al. |
| 2011/0131291 A1 | 6/2011 | Hon-anderson |
| 2011/0154268 A1 | 6/2011 | Trent et al. |
| 2011/0205159 A1 | 8/2011 | Gates et al. |
| 2011/0209069 A1 | 8/2011 | Mohler |
| 2011/0214162 A1 | 9/2011 | Brakensiek et al. |
| 2011/0221765 A1 | 9/2011 | Nason et al. |
| 2011/0230178 A1 | 9/2011 | Jones et al. |
| 2011/0231550 A1 | 9/2011 | Murray et al. |
| 2011/0231796 A1 | 9/2011 | Vigil |
| 2011/0231853 A1 | 9/2011 | Murray et al. |
| 2011/0246891 A1 | 10/2011 | Schubert et al. |
| 2011/0246904 A1 | 10/2011 | Pinto et al. |
| 2011/0307841 A1 | 12/2011 | Boldyrev et al. |
| 2011/0320535 A1 | 12/2011 | Donaldson |
| 2012/0017147 A1 | 1/2012 | Mark |
| 2012/0050183 A1 | 3/2012 | Lee |
| 2012/0054648 A1 | 3/2012 | Morris |
| 2012/0095643 A1 | 4/2012 | Bose et al. |
| 2012/0096167 A1 | 4/2012 | Free et al. |
| 2012/0173983 A1 | 7/2012 | Song |
| 2012/0174155 A1 | 7/2012 | Mowrey et al. |
| 2012/0176396 A1 | 7/2012 | Harper et al. |
| 2012/0210266 A1 | 8/2012 | Jiang et al. |
| 2012/0265528 A1 | 10/2012 | Gruber et al. |
| 2012/0266079 A1 | 10/2012 | Lee et al. |
| 2012/0274863 A1 | 11/2012 | Chardon et al. |
| 2012/0282914 A1 | 11/2012 | Alexander |
| 2012/0296919 A1 | 11/2012 | Sinha et al. |
| 2012/0317236 A1 | 12/2012 | Abdo et al. |
| 2013/0018659 A1 | 1/2013 | Chi |
| 2013/0024778 A1 | 1/2013 | Reeves et al. |
| 2013/0027315 A1 | 1/2013 | Teng |
| 2013/0031261 A1 | 1/2013 | Suggs |
| 2013/0050222 A1 | 2/2013 | Moran et al. |
| 2013/0055102 A1 | 2/2013 | Matthews et al. |
| 2013/0057572 A1 | 3/2013 | Anderson et al. |
| 2013/0066895 A1 | 3/2013 | Choi et al. |
| 2013/0070844 A1 | 3/2013 | Malladi et al. |
| 2013/0073932 A1 | 3/2013 | Migos et al. |
| 2013/0076591 A1 | 3/2013 | Sirpal et al. |
| 2013/0103770 A1 | 4/2013 | Kamolz et al. |
| 2013/0109371 A1 | 5/2013 | Brogan et al. |
| 2013/0113993 A1 | 5/2013 | Dagit, III |
| 2013/0135195 A1 | 5/2013 | Josephson et al. |
| 2013/0143529 A1 | 6/2013 | Leppanen |
| 2013/0151989 A1 | 6/2013 | Dent et al. |

(56) References Cited

U.S. PATENT DOCUMENTS

| | | |
|---|---|---|
| 2013/0167159 A1 | 6/2013 | Ricci et al. |
| 2013/0179838 A1 | 7/2013 | Levee et al. |
| 2013/0187861 A1 | 7/2013 | Lavallee |
| 2013/0204967 A1 | 8/2013 | Seo et al. |
| 2013/0207898 A1 | 8/2013 | Sullivan et al. |
| 2013/0214996 A1 | 8/2013 | Reeves et al. |
| 2013/0258037 A1 | 10/2013 | Kim et al. |
| 2013/0276015 A1 | 10/2013 | Rothschild et al. |
| 2013/0276030 A1 | 10/2013 | Fujimoto |
| 2013/0278484 A1 | 10/2013 | Hwang et al. |
| 2013/0283193 A1 | 10/2013 | Griffin |
| 2013/0283213 A1 | 10/2013 | Guendelman et al. |
| 2013/0288603 A1 | 10/2013 | Iwasaki |
| 2013/0326583 A1 | 12/2013 | Freihold et al. |
| 2013/0328667 A1 | 12/2013 | Kumar et al. |
| 2013/0332172 A1 | 12/2013 | Prakash et al. |
| 2013/0332846 A1 | 12/2013 | Freedman |
| 2013/0335340 A1 | 12/2013 | Smith |
| 2013/0347018 A1 | 12/2013 | Limp et al. |
| 2014/0022192 A1 | 1/2014 | Hatanaka |
| 2014/0026068 A1 | 1/2014 | Park et al. |
| 2014/0028918 A1 | 1/2014 | Kim |
| 2014/0028921 A1 | 1/2014 | Moon et al. |
| 2014/0045433 A1 | 2/2014 | Kim |
| 2014/0051408 A1 | 2/2014 | Jenzowsky et al. |
| 2014/0098182 A1 | 4/2014 | Kramarenko et al. |
| 2014/0118222 A1 | 5/2014 | Barrett et al. |
| 2014/0129695 A1 | 5/2014 | Yerli |
| 2014/0164312 A1 | 6/2014 | Lynch et al. |
| 2014/0173529 A1 | 6/2014 | Hicks |
| 2014/0181639 A1 | 6/2014 | Lund et al. |
| 2014/0181715 A1 | 6/2014 | Axelrod et al. |
| 2014/0244782 A1 | 6/2014 | Beaurepaire et al. |
| 2014/0215347 A1 | 7/2014 | Lin |
| 2014/0218289 A1 | 8/2014 | Dai et al. |
| 2014/0229858 A1 | 8/2014 | Bleker et al. |
| 2014/0244266 A1 | 8/2014 | Brown et al. |
| 2014/0244712 A1 | 8/2014 | Walters et al. |
| 2014/0249821 A1 | 9/2014 | Kennewick et al. |
| 2014/0267074 A1 | 9/2014 | Balci et al. |
| 2014/0282103 A1 | 9/2014 | Crandall |
| 2014/0304019 A1 | 10/2014 | Scott |
| 2014/0350936 A1 | 11/2014 | Kanai |
| 2014/0365336 A1 | 12/2014 | Hurewitz |
| 2015/0011277 A1 | 1/2015 | Wakeford et al. |
| 2015/0025976 A1 | 1/2015 | Guo et al. |
| 2015/0061842 A1 | 3/2015 | Yoon et al. |
| 2015/0066897 A1 | 3/2015 | Vronay et al. |
| 2015/0103015 A1 | 4/2015 | Berglund et al. |
| 2015/0138213 A1 | 5/2015 | Turner et al. |
| 2015/0169550 A1 | 6/2015 | Cvijetic et al. |
| 2015/0177860 A1 | 6/2015 | Imai |
| 2015/0234856 A1 | 8/2015 | Havekes et al. |
| 2015/0268607 A1 | 9/2015 | Truong et al. |
| 2015/0324067 A1 | 11/2015 | Cabral |
| 2015/0355715 A1 | 12/2015 | Smith |
| 2015/0355955 A1 | 12/2015 | Chakra et al. |
| 2015/0371364 A1 | 12/2015 | Park |
| 2015/0373065 A1 | 12/2015 | Holmquist et al. |
| 2016/0070461 A1 | 3/2016 | Herbordt et al. |
| 2016/0070580 A1 | 3/2016 | Johnson et al. |
| 2016/0085396 A1 | 3/2016 | Pendlay et al. |
| 2016/0085430 A1 | 3/2016 | Moran et al. |
| 2016/0085439 A1 | 3/2016 | Threlkeld et al. |
| 2016/0085698 A1 | 3/2016 | Mikkola et al. |
| 2016/0086581 A1 | 3/2016 | Khoury et al. |
| 2016/0088060 A1 | 3/2016 | Rahman et al. |
| 2016/0162151 A1 | 6/2016 | Xu |
| 2016/0261921 A1 | 9/2016 | Malko |
| 2016/0267546 A1 | 9/2016 | Marsh |

FOREIGN PATENT DOCUMENTS

| | | |
|---|---|---|
| EP | 2509292 A1 | 10/2012 |
| EP | 2632131 A1 | 8/2013 |
| EP | 2701044 A1 | 2/2014 |
| EP | 2712152 A1 | 3/2014 |
| FR | 2996086 A1 | 3/2014 |
| WO | 2009143294 A2 | 11/2009 |
| WO | 2013112143 A1 | 8/2013 |
| WO | 2013171487 A1 | 11/2013 |
| WO | 2013184394 A2 | 12/2013 |
| WO | 2014038918 A1 | 3/2014 |

OTHER PUBLICATIONS

"Chromecast", Retrieved from: https://web.archive.org/web/20140703072247/http://www.google.com/intl/en/chrome/devices/chromecast/, Retrieved on: Jul. 3, 2014, 6 Pages.

"Considering CarPlay", Retrieved from: http://getwired.com/2014/03/05/considering-carplay/, Mar. 5, 2014, 5 Pages.

"Creating Separate Back Stacks for Android Application Tabs using Fragments", Retrieved from: https://www.abtosoftware.com/blog/creating-separate-back-stacks-for-android-apps-tabs-using-fragments, Apr. 30, 2013, 3 Pages.

"Design A for P2", Retrieved from: https://pyra-handheld.com/boards/threads/design-a-for-p2.69808/, Jan. 15, 2013, 6 Pages.

"iDispiay: Extra Monitor for your Mac or PC", Retrieved from: https://web.archive.org/web/20160110104523/http://www.getdisplay.com/, Nov. 1, 2013, 3 Pages.

"In Every Dual-core Phone, there's a PC Trying to Get Out", Retrieved from: https://web.archive.org/web/20130417120250/https://www.ubuntu.com/phone/ubuntu-for-android, Retrieved Date: Sep. 25, 2013, 8 Pages.

"Microsoft SMB Protocol Packet Exchange Scenario", Retrieved from http://web.archive.org/web/20120731231956/https://msdn.microsoft.com/en-us/library/windows/desktop/aa365236(v=vs.85).aspx, Jul. 31, 2012, 3 Pages.

"Providing Proper Back Navigation", Retrieved from: https://developer.android.com/training/implementing-navigation/temporal.html, May 18, 2013, 4 Pages.

"SlingPlayer for Connected Devices", Retrieved from http://forms.sling.com/go/spcd, Jun. 25, 2014, 3 Pages.

"Spring Echo-Dual-Screen Simul-tasking Phone", Retrieved From: http://www.unp.me/f106/sprint-echo-dual-screen-simul-tasking-phone-139170/, Feb. 10, 2011, 3 Pages.

"The PadFone is not the future", Retrieved From: http://getwired.com/2013/04/14/1471/, Apr. 14, 2013, 3 Pages.

"Touch Mouse—iPhone/iPod Touch", Retrieved From: https://www.youtube.com/watch?v=iCI7iKv91GE, Feb. 1, 2010, 5 Pages.

"What is Ubuntu for Android?", Retrieved from https://web.archive.org/web/20140704145730/https://www.ubuntu.com/phone/ubuntu-for-android, Retrieved Date: Jul. 3, 2014, 9 Pages.

"Xperia Z: Experience the best of Sony in a smartphone", Retrieved From:http://www.sony.com.au/microsite/xperia-z/?, Feb. 17, 2013, 11 Pages.

"Final Office Action issued in U.S. Appl. No. 14/481,821", dated May 9, 2017, 17 Pages.

"Final Office Action Issued in U.S. Appl. No. 14/481,821", dated Jul. 3, 2018, 21 Pages.

"Non Final Office Action Issued in U.S. Appl. No. 14/481,821", dated Feb. 9, 2018, 18 Pages.

"Non-Final Office Action Issued in U.S. Appl. No. 14/481,821", dated Aug. 12, 2016, 16 Pages.

"Final Office Action Issued in U.S. Appl. No. 14/495,122", dated Mar. 30, 2018, 16 Pages.

"Final Office Action Issued in U.S. Appl. No. 14/495,122", dated Apr. 11, 2018, 16 Pages.

"Non-Final Office Action Issued in U.S. Appl. No. 14/495,122", dated Oct. 25, 2016, 14 Pages.

"Non-Final Office Action Issued in U.S. Appl. No. 14/495,122", dated Sep. 14, 2017, 15 Pages.

"Final Office Action Issued in U.S. Appl. No. 14/495,158", dated May 5, 2017, 11 Pages.

"Final Office Action Issued in U.S. Appl. No. 14/495,158", dated Jul. 20, 2018, 20 Pages.

"Non Final Office Action Issued in U.S. Appl. No. 14/495,158", dated Oct. 12, 2016, 13 Pages.

(56) References Cited

OTHER PUBLICATIONS

"Non Final Office Action Issued in U.S. Appl. No. 14/495,158", dated Dec. 14, 2017, 16 Pages.
"Non-Final Office Action Issued in U.S. Appl. No. 14/495,181", dated Mar. 2, 2017, 19 Pages.
"Final Office Action Issued in U.S. Appl. No. 14/495,228", dated Aug. 10, 2018, 24 Pages.
"Final Rejection Issued in U.S. Appl. No. 14/495,228", dated Jun. 12, 2017, 29 Pages.
"Non Final Office Action Issued in U.S. Appl. No. 14/495,228", dated Dec. 29, 2016, 26 Pages.
"Non Final Rejection Issued in U.S. Appl. No. 14/495,228", dated Dec. 29, 2017, 29 Pages.
"Final Office Action Issued in U.S. Appl. No. 14/495,268", dated Jun. 26, 2017, 18 Pages.
"Final Office Action Issued in U.S. Appl. No. 14/495,268", dated Jul. 25, 2018, 17 Pages.
"Office Action Issued in European Patent Application No. 15775852.5", dated Apr. 5, 2018, 5 Pages.
"Office Action Issued in European Patent Application No. 15775856.6", dated May 29, 2018, 6 Pages.
Baur, et al., "Virtual Projection: Exploring Optical Projection as a Metaphor for Multi-Device Interaction", In Proceedings of the ACM SIGCHI Conference on Human Factors in Computing Systems, May 5, 2012, 10 Pages.
Borchers, et al., "Stanford Interactive Workspaces: A Framework for Physical and Graphical User Interface Prototyping", In Proceedings of the IEEE Wireless Communications, vol. 9, Issue 6, Dec. 2002, 7 Pages.
Calvary, et al., "A Unifying Reference Framework for Multi-Target user Interfaces", In Journal of Interacting with Computers, vol. 15, Issue 3, Jun. 1, 2003, pp. 289-308.
Cass, Stephen, "Big Fridge is Watching you [Smart Technologies Monitoring Food from Production to consumption]", In Proceedings of the Spectrum, vol. 50 , Issue 6, Jun. 1, 2013, 1 Page.
Chang, Alexandra, "Up Close with iOS 5: New gestures", Retrieved From: http://www.macworld.com/article/1163019/ios_5_new_gestures.html, Oct. 14, 2011, 4 Pages.
Ciprian, Rusen, "How to Work With Network Drives & Network Locations", Retrieved From https://www.howtogeek.com/school/windows-network-sharing/lesson8/, Apr. 16, 2014, 25 Pages.
Cohen, Peter, "OSX Mavericks Preview: Multiple Displays Finally Work Like They're Supposed to", Retrieved from http://www.imore.com/os-x-mavericks-preview-multiple-displays, Jul. 8, 2013, 8 Pages.
Dachis, Adam, "How to Automatically Unlock Your Gadgets Without a Password", Retrieved From: https://lifehacker.com/how-to-make-your-smartphone-automatically-unlock-your-s-510592193, Jun. 3, 2013, 9 Pages.
Dachselt, et al., "Throw and Tilt-Seamless Interaction Across Devices Using Mobile Phone Gestures", In Proceedings of the 2nd Workshop on Mobile and Embedded Interactive Systems, Sep. 11, 2008, 7 Pages.
Etherington, Darrell, "Mosaic Lets You Weave a Single Display From Multiple iPhones and iPads, Offers SDK for Developers", Retrieved From: https://techcrunch.com/2013/04/02/mosaic-lets-you-weave-a-single-display-from-multiple-iphones-and-ipads-offers-sdk-for-developers/, Apr. 2, 2013, 7 Pages.
Greenberg, et al., "PDAs and Shared Public Displays: Making Personal Information Public, and Public Information Personal", In Proceedings of the Personal Technologies, vol. 3, Issue 1, Mar. 1999, 11 Pages.
Grolaux, et al., "Attach me, Detach me, Assemble me like You Work", In Proceedings of the Human-Computer Interaction, vol. 5, Sep. 12, 2005, 14 Pages.
Hamblen, Matt, "Google Chromecast controls TV from smartphones, tablets, laptops", Retrieved From: http://www.computerworld.com/article/2484298/tablets/google-chromecast-controls-tv-from-smartphones--tablets--laptops.html, Jul. 24, 2013, 5 Pages.

Hardawar, Devindra, "Kyocera's Echo phone brings dual-screens and "Simul-Tasking" to Sprint", Retrieved From: https://venturebeat.com/2011/02/08/kyocera-echo/, Feb. 8, 2011, 4 Pages.
Heape, Judd, "Driving an External Monitor from Handhelds", In Proceedings of the Times—India, Mar. 2008, 2 Pages.
Kernchen, et al., "Multimodal user interfaces for context-aware mobile applications", In Proceedings of the IEEE 16th International Symposium on Personal, Indoor and Mobile Radio Communications, vol. 4, Sep. 11, 2005, pp. 2268-2273.
Kong, et al., "Design of Human-Centric Adaptive Multimodal Interfaces", In International Journal of Human-Computer Studies, vol. 69, Issue 12, Jul. 28, 2011, pp. 854-869.
Korpipaa, et al., "Managing Context Information in Mobile Devices", In Proceedings of the IEEE Pervasive Computing, vol. 2 , Issue 3, Jul. 1, 2003, pp. 42-51.
Martin, B R., "Separate Back Stack for Each Lab in Android using Fragments", Retrieved from http://stackoverflow.com/questions/6987334/separate-back-stack-for-each-lab-in-android-using-fragments, May 18, 2013, 17 pages.
Menoo, Schoone, "Sharing files with a mapped network drive", Retrieved From http://www.optimizingpc.com/miscellaneous/sharing_files_shared_folder.html, Feb. 1, 2012, 4 Pages.
Newman, et al., "User Interfaces When and Where They are Needed: An Infrastructure for Recombinant Computing", In Proceedings of the ACM 15th Annual Symposium on User Interface Software and Technology, vol. 4, Issue 2, Oct. 27, 2002, pp. 171-180.
Oremland, Paul, "Building for Multiple Screens", Retrieved From: http://tech.infospace.com/2013/10/18/building-for-multiple-screens/, Oct. 18, 2013, 6 Pages.
"Second Written Opinion Issued in PCT Application No. PCT/US2015/051133", dated Sep. 7, 2016, 12 Pages.
"International Preliminary Report on Patentability Issued in PCT Application No. PCT/US2015/048748", dated Oct. 6, 2016, 8 Pages.
"International Search Report & Written Opinion Issued in PCT Application No. PCT/US2015/048748", dated Dec. 11, 2015, 13 Pages.
"Second Written Opinion Issued in PCT Application No. PCT/US2015/048748", dated Jul. 4, 2016, 7 Pages.
"International Preliminary Report on Patentability Issued in PCT Application No. PCT/US2015/050317", dated Dec. 6, 2016, 7 Pages.
"International Search Report and Written Opinion Issued in PCT Application No. PCT/US2015/050317", dated Feb. 16, 2016, 24 Pages.
"Second Written Opinion Issued in PCT Application No. PCT/US2015/050317", dated Aug. 18, 2016, 6 Pages.
"International Preliminary Report on Patentability Issued in PCT Application No. PCT/US2015/050319", dated Jul. 18, 2016, 10 Pages.
"International Search Report & Written Opinion Issued in PCT Application No. PCT/US2015/050319", dated Dec. 3, 2015, 10 Pages.
"Second Written Opinion Issued in PCT Application No. PCT/US2015/050319", dated May 27, 2016, 8 Pages.
"International Search Report & Written Opinion Issued in PCT Application No. PCT/US2015/050664", dated Nov. 27, 2015, 13 Pages.
"Response to Written Opinion Issued in PCT Application No. PCT/US2015/050664", Filed Date: Jun. 22, 2016, 5 Pages.
"Second Written Opinion Issued in PCT Application No. PCT/US2015/050664", dated Sep. 19, 2016, 5 Pages.
"International Preliminary Report on Patentability Issued in PCT Application No. PCT/US2015/050690", dated Dec. 1, 2016, 6 Pages.
"International Search Report & Written Opinion Issued in PCT Application No. PCT/US2015/050690", dated Nov. 25, 2015, 10 Pages.
"Response to Written Opinion Filed in PCT Application No. PCT/US2015/050690", Filed Date: Apr. 8, 2016, 8 Pages.
"Second Written Opinion Issued in PCT Application No. PCT/US2015/050690", dated May 27, 2016, 4 Pages.

(56) References Cited

OTHER PUBLICATIONS

"International Preliminary Report on Patentability Issued in PCT Application No. PCT/US2015/050838", dated Dec. 12, 2016, 8 Pages.
"International Search Report & Written Opinion Issued in PCT Application No. PCT/US2015/050838", dated Jan. 13, 2016, 14 Pages.
"Response to Written Opinion Filed in PCT Application No. PCT/US2015/050838", Filed Date: Jun. 24, 2016, 23 Pages.
"Second Written Opinion Issued in PCT Application No. PCT/US2015/050838", dated Sep. 6, 2016, 8 Pages.
"International Preliminary Report on Patentability Issued in PCT Application No. PCT/US2015/050846", dated Nov. 3, 2016, 8 Pages.
"International Search Report & Written Opinion Issued in PCT Patent Application No. PCT/US2015/050866", dated Jan. 8, 2016, 14 Pages.
"Response to Written Opinion Filed in PCT Application No. PCT/US2015/050866", Filed Date: Mar. 18, 2016, 6 Pages.
"Response to Written Opinion Filed in PCT Application No. PCT/US2015/050866", Filed Date: May 2, 2016, 20 Pages.
"Second Written Opinion Issued in PCT Application No. PCT/US2015/050866", dated Aug. 1, 2016, 8 Pages.
"International Preliminary Report on Patentability Issued in PCT Application No. PCT/US2015/051128", dated Dec. 19, 2016, 8 Pages.
"International Search Report & Written Opinion Issued in PCT Application No. PCT/US2015/051128", dated Dec. 2, 2015, 11 Pages.
"Second Written Opinion Issued in PCT Application No. PCT/US2015/051128", dated Sep. 5, 2016, 6 Pages.
"International Preliminary Report on Patentability Issued in PCT Application No. PCT/US2015/051133", dated Dec. 2, 2016, 12 Pages.
"International Search Report & Written Opinion Issued in PCT Application No. PCT/US2015/051133", dated Jan. 13, 2016, 13 Pages.
"Response to Written Opinion Filed in PCT Application No. PCT/US2015/051133", Filed Date: Jul. 22, 2016, 24 Pages.
"Response to Written Opinion Filed in PCT Application No. PCT/US2015/080846", Filed Date: May 19, 2016, 25 Pages.
Piazza, et al., "Holy Smartphones and Tablets, Batman! Mobile Interaction's Dynamic Duo", In Proceedings of the ACM 11th Asia Pacific Conference on Computer Human Interaction, Sep. 24, 2013, 10 Pages.
Scheible, et al., "MobiToss: A Novel gesture based interface for creating and sharing mobile multimedia art on large public displays", In Proceedings of the 16th ACM International Conference on Multimedia, Oct. 26, 2008, pp. 957-960.
Schmidt, et al., "A Cross-Device Interaction Style for Mobiles and Surfaces", In Proceedings of the ACM Designing Interactive Systems Conference, Jun. 11, 2012, pp. 318-327.
Schmidt, Albrecht, "Implicit Human Computer Interaction Through Context", In Proceedings of the Personal Technologies, vol. 4, Issue 2, Jan. 1, 2000, pp. 191-199.
Seifert, et al., "Extending Mobile Interfaces with External Screens", In Proceedings of the 14th International Conference on Human-Computer Interaction (Interact), Sep. 2, 2013, pp. 722-729.
Solamalai, et al., "In-Car Entertainment using Mobile Devices: A study on Automotive Manufactures in India", In International Journal of Engineering Science and Technology, vol. 2, Issue 1, Jun. 30, 2014, 4 Pages.
Suk, et al., "Distributed Speech Recognition System for PDA in Wireless Network Environment", In Proceedings of the 9th Conference on Speech and Computer, Sep. 20-22, 2004, 4 Pages.
Tahir, et al., "ARemote: A Tangible Interface for Selecting TV Channels", In Proceedings of the IEEE 17th International Conference on Artificial Reality and Telexistence, Nov. 28, 2007, 2 Pages.
Taylor, Nathan, "Multiple TV remotes showcase the evils of complexity. Smart TVs just make it worse", Retrieved from: https://praxtime.com/2014/01/13/multiple-remotes-evil/, Jan. 13, 2014, 4 Pages.
Teng, Albert, "Share Android Device Screen with Other Devices", Retrieved from: https://web.archive.org/web/20170502183134/https://www.youtube.com/watch?v=Ygng30ir1tc, Dec. 17, 2012, 4 Pages.
Thurrott, Paul, "Google I/O 2014: Android Takes the L", Retrieved from: http://winsupersite.com/mobile-devices/google-io-2014-android-takes-I, Jun. 25, 2014, 12 Pages.
"Second Written Opinion Issued in PCT Application No. PCT/US2015/050846", dated Aug. 22, 2016, 6 Pages.
"International Preliminary Report on Patentability Issued in PCT Application No. PCT/US2015/050866", dated Jan. 11, 2017, 13 Pages.
"Final Office Action Issued in U.S. Appl. No. 14/495,299", dated Nov. 30, 2017, 24 Pages.
"Final Office Action Issued in U.S. Appl. No. 14/495,299", dated Jan. 27, 2017, 28 Pages.
"Non-Final Office Action Issued in U.S. Appl. No. 14/495,299", dated Jun. 30, 2017, 30 Pages.
"Non-Final Office Action Issued in U.S. Appl. No. 14/495,299", dated Sep. 9, 2016, 24 Pages.
"Final Office Action Issued in U.S. Appl. No. 14/495,355", dated Nov. 14, 2017, 11 Pages.
"Non-Final Office Action Issued in U.S. Appl. No. 14/495,355", dated Feb. 2, 2017, 12 Pages.
"Restriction Requirement Issued in U.S. Appl. No. 14/495,355", dated Sep. 19, 2016, 7 Pages.
"Non-Final Office Action Issued in U.S. Appl. No. 14/495,420", dated Nov. 9, 2016, 23 Pages.
Wang, et al., "Dynamic Cloud Resource Reservation via Cloud Brokerage", In IEEE 33rd International Conference on Distributed Computing Systems, Jul. 8, 2013, 12 Pages.
"Final Office Action Issued in U.S. Appl. No. 14/495,443", dated Apr. 6, 2017, 38 Pages.
"Final Office Action Issued in U.S. Appl. No. 14/495,443", dated Jan. 25, 2018, 42 Pages.
"Non Final Office Action Issued in U.S. Appl. No. 14/495,443", dated Jul. 27, 2017, 41 Pages.
"Non-Final Office Action Issued in U.S. Appl. No. 14/495,443", dated Aug. 26, 2016, 42 Pages.
"Office Action Issued in European Patent Application No. 15775022.5", dated Jun. 22, 2018, 8 Pages.
"Non-Final Office Action Issued in U.S. Appl. No. 14/495,268", dated Jan. 2, 2018, 17 Pages.
"Non-Final Office Action Issued in U.S. Appl. No. 14/495,268", dated Dec. 16, 2016, 16 Pages.
"International Search Report & Written Opinion", Issued in PCT Application No. PCT/US2015/050846, dated Jan. 5, 2016, 12 Pages.
"Response to Written Opinion", Issued in PCT Application No. PCT/US2015/050846, dated May 19, 2016, 25 Pages.
"Office Action Issued in European Patent Application No. 15775849.1", dated Oct. 16, 2018, 6 Pages.
"Office Action Issued in European Patent Application No. 15775852.5", dated Sep. 3, 2018, 6 Pages.
"Non Final Office Action Issued in U.S. Appl. No. 14/481,821", dated Mar. 7, 2019, 23 Pages
"Non Final Office Action Issued in U.S. Appl. No. 14/495,158", dated Dec. 20, 2018, 20 Pages.
"Non Final Office Action Issued in U.S. Appl. No. 14/495,228", dated Jan. 11, 2019, 24 Pages.
"Final Office Action Issued in U.S. Appl. No. 14/495,268", dated Jan. 10, 2019, 16 Pages.
"Office Action Issued in European Patent Application No. 15775852.5", dated Feb. 19, 2019, 6 Pages.
"Office Action Issued in European Patent Application No. 15775022.5", dated Jan. 16, 2019, 7 Pages.

PRESENTATION OF COMPUTING ENVIRONMENT ON MULTIPLE DEVICES

CROSS-REFERENCE TO RELATED APPLICATIONS

This application is a continuation of, and claims priority under 35 U.S.C. §§ 119-120 to, U.S. patent application Ser. No. 14/495,420, entitled "Presentation of Computing Environment on Multiple Devices," filed on Sep. 24, 2014, the entirety of which is hereby incorporated by reference as if fully rewritten herein.

BACKGROUND

Within the field of computing, many scenarios involve an interaction of a user with a device collection, such as a laptop, a mobile phone, a tablet, and a media server. The user may acquire a variety of devices for the device collection in order to cover the user's interests and tasks, such as editing documents, viewing movies, driving a vehicle, and interacting with friends. Each device may present a computing environment, comprising a set of user accounts and credentials, available and/or executing applications, application configurations and state, documents, media objects, and connections with other devices within and outside the device collection.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The configuration of devices to present a computing environment may lead to a disjointed experience, wherein each device of the device collection presents a computing environment based on the device properties of the device. However, this model may entail a disjointed computing experience, wherein the user separately configures and maintains the configuration of each device, and where differences among the computing environments are driven by differences in the properties of each device, such as the applications that are available for and compatible with the architecture of the device. Additionally, interaction with one device may not entail a change on another device; e.g., the user may install an application, adjust an application configuration, or create or edit a document on a first device of the device collection, but such changes may not appear on a second device of the device collection.

Other techniques may be utilized to coordinate the presentation of the computing environment on various devices of the device collection. As a first such example, file synchronization among the devices may enable changes to a file collection through a first device to be automatically reflected on a second device. However, such file synchronization may exhibit inefficiency (e.g., an update of a file on a particular device entails a transmission of the file to all other devices to ensure propagation of the update), and may result in concurrency errors (e.g., updates of a particular file may occur on a first device and a second device, and it may be difficult to resolve such concurrent updating). Alternatively, in a terminal services model, a primary device may transmit a computing environment on a variety of devices. However, if each device presents the same computing environment irrespective of the properties of the device, then some devices may not be capable of utilizing some device properties with the device, while other device may not be capable of rendering the computing environment in a suitable manner.

Presented herein are techniques for enabling a device collection to present a computing environment hosted by a primary device. In accordance with such techniques, a primary device of the device collection may store and maintain a primary computing environment that is to be presented on each of several auxiliary devices of the device collection. For each auxiliary device, the primary device may adapt the primary computing environment to an auxiliary computing environment that is adapted based on the particular device properties of the auxiliary device, such as its computational resources, input and output capabilities, communications capabilities, power supply, and user context. Additionally, when a request is received to execute an application on an auxiliary device, the primary device may execute the application within the auxiliary computing environment on behalf of the auxiliary device, and may adapt the application to the device properties of the auxiliary device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
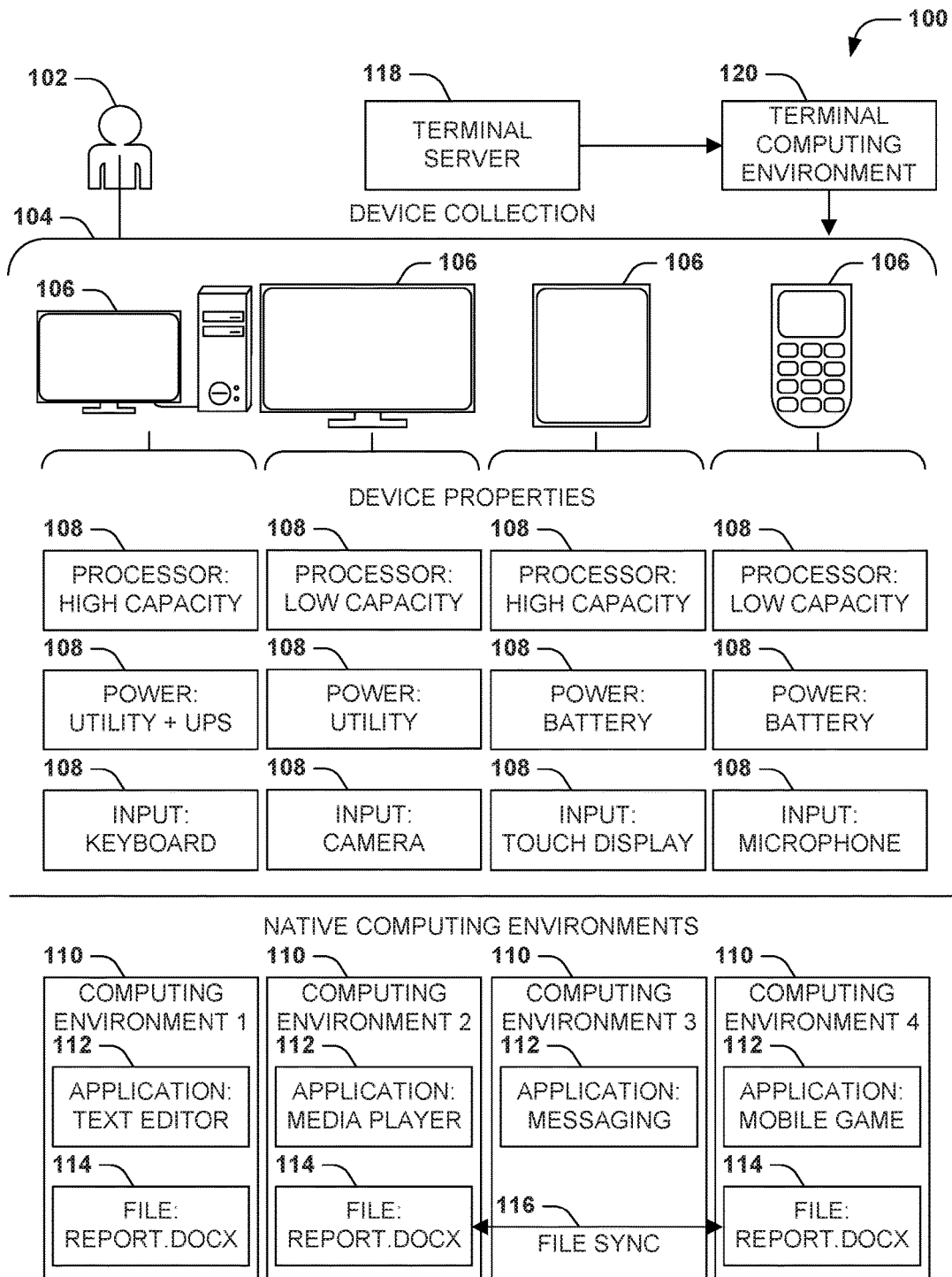
FIG. 1 is an illustration of an example scenario featuring an interaction of a user with a set of devices of a device collection.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring various techniques for allowing a user 102 to interact with a set of devices 106 within a device collection 104. In this example scenario 100, the user 102 has acquired a variety of devices 106 of different types, such as a workstation, a home theater computer, a portable tablet, and a mobile phone. The respective devices 106 of the device collection 104 exhibit a set of device properties 108, such as a processor having a particular processing capacity and supporting a particular instruction set architecture; a power source, such as a connection to a utility line, a battery, and/or an uninterruptible power supply (UPS); and a set of input and output components that enable interaction with the user 102. Other such device properties 108 include, e.g., coprocessors for rendering video, encoding or decoding various forms of data; volatile and nonvolatile memory components; communication components, such as wired and wireless network adapters and near field communication (NFC) adapters; peripherals, such as printers and scanners; and associated components in embedded device scenarios, such as automotive components of a vehicle control system. The respective devices 106 also exhibit a native computing environment 110, such as a native operating system of the device 106; a collection of applications 112 that execute within the operating system; and a set of files 114 stored on each device 106.

The user 102 of the device collection 104 may interact with each device 106 in a particular manner, and may therefore configure each device 106 according to its intended use. As a first example, the workstation device 106 may feature a robust desktop operating system, and a set of applications 112 selected therefor, such as text editors, compilers, and media editing software. As a second example, the home theater device 106 may feature a large-area display; a media-centered operating system presenting a comparatively limited set of applications 112, such as a media player and a media library, and a comparatively limited set of device properties 108, such as a commodity processor that is suitable for rendering media, but incapable of robust parallel processing. As a third example, the tablet device 106 may present a portable computing experience, and may present a robust operating system that is executed on a high-capacity processor and that interacts with the user 102 primarily via a capacitive touch-sensitive display. A fourth example, a fourth device 106 may comprise a mobile phone featuring energy-conserving hardware, a battery, and a communications-oriented operating system through which mobility applications 112 may be executed.

In this example scenario 100, while interacting with this device collection 104, the user 102 may observe marked differences while interacting with the respective device 106. As a first example, a user interaction of a user 102 with a device collection 104 comprising a set of devices 106. In this example scenario 100, the user 102 acquires the devices 106 to cover a broad set of interests and tasks, such as editing documents; viewing various forms of media; playing games; communicating with professional and social contacts; and discovering information that facilitates the user's day-to-day activities, such as vehicle mapping and navigation. Each device 106 of the device collection 104 may present a computing environment 114, such as a collection of applications 112 that are installed and executable on each device 106; various collections of data, such as user files, media objects, and web links; and various forms of user interfaces, such as operating systems adapted for casual and/or professional user interactions. Each device 106 may also feature a different set of components, such as displays of varying quality and resolution; speakers, headphones, and/or earpieces to provide audio output to the user 102; input devices such as keyboards, mice, and touch-sensitive displays; and other peripherals, such as cameras and communication devices. As a second example, the variance in operating systems may expose different types of functionality through each device 106 (e.g., differences in the appearance and behavior of the operating system user interfaces; in the available tools and operations; and in the recognized input on each device 106, such as the keyboard shortcuts and gestures that are usable to issue commands to each device 106). As a third such example, an application 112 that is executable on a first device 106 may not be executable on a second device 106, e.g., due to compatibility issues between the operating systems and instruction set architectures of the devices 106. The user 102 may endeavor to install a comparable set of applications 112 on each device 106 (e.g., different variants of the same application that have been developed for different platforms, or applications by different developers that perform the same task), but undesirable differences may persist among superficially similar but architecturally different applications 112.

Further difficulties may arise in the degree of device configuration and management performed by the user 102 to establish and maintain consistency among the devices 106 of the device collection 104; i.e., when the user 102 configures a first device 106 (e.g., installing an application 112 or updating the application configuration), the user 102 may have to perform manual reconfiguration of one or more other devices 106, and perhaps all of the devices 106, in a similar manner. As a first such example, if a first device 106 uses a service that is protected by a password, and the user 102 changes the service password through the first device 106, the user 102 may have to reconfigure other devices 106 the use same updated password. As a second such example, when the user 102 installs an application 112 or creates or edits a file 114 on a first device 106, such changes are not automatically reflected on a second device 106 unless the user 102 has configured both devices 106 to coordinate such updates. For example, the user 102 may configure a file synchronization process 116, such that a file 114 that is created, modified, or deleted on a second device 106 is automatically synchronized with the fourth device. However, such techniques may entail a possibly extensive and perhaps frustrating degree of involvement and management by the user 102 to implement and maintain. Moreover, even where such techniques confer an appearance of synchrony (e.g., the devices 106 may perform the file synchronization 116 in such a performant manner as to imply that the devices 106 are utilizing a single set of files 114), problems may arise that cause such abstractions to "leak." As a first such example, a particular file 114 may be concurrently edited on the second device 106 and the fourth device 106. Selecting either version may cause a loss of data in the other version, and the devices 106 may have no capacity for determining how to merge such changes. As a second such example, while the third device 106 is disconnected from the device collection 104, various files 114 may be unavailable and/or outdated when accessed through the third device 106. As a third such example, mitigating limitations such as versioning conflicts may entail more stringent measures that are associated with other undesirable effects; e.g., a locking mechanism may be utilized to ensure that only a first device 106 having exclusive access to a file 114 may view or modify it, but such locking mechanisms may cause a second device 106 seeking to access the same file 114 to stall and/or crash.

In view of these and other limitations arising from the presentation of an isolated computing environment 110 by each device 106, techniques may be utilized to facilitate uniformity among the devices 106. For example, a terminal server 118 may generate a terminal computing environment 120, such as a single user account providing operating system settings, a single set of applications 112 and application configurations, and a single set of files 114 and hardware components that are accessible to the terminal server 118. The terminal server 118 may then transmit a presentation of the terminal computing environment 120 to each of the devices 106 (e.g., transmitting video of the terminal computing environment 120 to each device 106 and receiving input from each device 106), which may render the same terminal computing environment 120 uniformly for the user 102.

However, such terminal services techniques may exhibit further limitations, such as the incapability of the terminal server 118 to permit concurrent use of one terminal computing environment 120 by several devices 106. Additionally, the presentation of one terminal computing environment 120 on a variety of devices 106 may provide uniformity among the devices 106, but possibly resulting in a suboptimal experience. If a uniform terminal computing environment 120 is transmitted to each device 106 without regard to the device properties 108 of each device 106, some device properties 108 may not be exposed within the terminal computing environment 120. For example, a particular device 106 may comprise a camera, but the terminal computing environment 120 may not be aware of the provision of the camera, may not have suitable software installed such as drivers and camera-oriented applications 112, and may therefore not enable the availability of the camera within the terminal computing environment 120. Conversely, some devices 106 may lack suitable device properties 108 to present the terminal computing environment 120; e.g., the terminal computing environment 120 may provide an application 108 that is not supported by the device properties 108 of some devices 106, or may simply not be rendered by a particular device 106 with an acceptable user experience. For example, the presentation of the terminal computing environment 120 on a low-powered mobile phone may result in the display of a small fraction of a desktop space, entailing a significant degree of scrolling to view any portion thereof, and/or may exhibit an unusably low frame rate and high user input latency due to the power-conserving processor of the device 106. Such limitations may arise from the limited flexibility in the provision of a single terminal computing environment 120 to a variety of devices 106 in the interests of user experience uniformity.

B. Presented Techniques

Presented herein are techniques for configuring a device collection 104 to present a consistent computing environment through a variety of devices, but that is adapted to the device properties 108 of each device 106.

Figure 2:
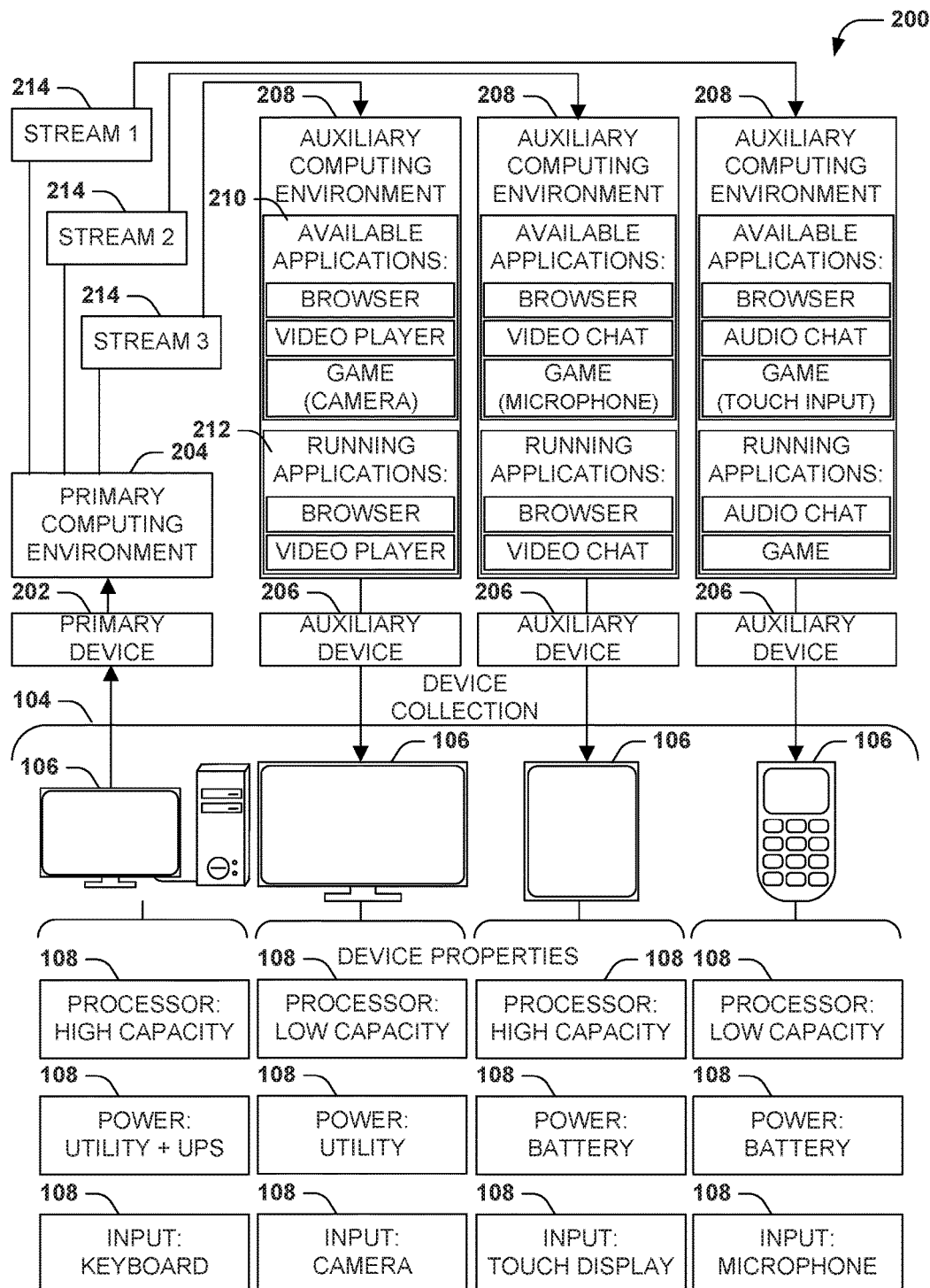
FIG. 2 is an illustration of an example scenario featuring a presentation of a computing environment on a device collection of auxiliary devices, in accordance with the techniques presented herein.

FIG. 2 is an illustration of an example scenario 200 featuring a device collection 104 of devices 106 that interoperate to present a consistent computing environment to a user 102. In this example scenario 200, among the device collection 104, a particular device 104 is designated as a primary device 202, which generates and maintains a primary computing environment 204, such as a primary collection of operating system settings, applications 112, application configurations, files 114, and user accounts and credentials. For each auxiliary device 206 of the device collection 104, the primary device 202 may adapt the primary computing environment 204 to an auxiliary computing environment 208, according to the device properties 108 of the auxiliary device 106. For example, the primary device 202 may select the display color scheme, icon and font types and sizes, input modalities, full-screen vs. windowed interaction models, and component availability and configuration (e.g., pointer behavior) according to the device properties 108 of each auxiliary device 206. For each auxiliary device 206, the primary device 202 may transmit the particular auxiliary computing environment 208 for that auxiliary device 206 as a stream 214. The streaming 214 of the auxiliary computing environment 208 may involve the transmission by the primary device 202 of audio, video, and other forms of output for rendering by the auxiliary device 206, as well as instructions to the device properties 108 and components of the auxiliary device 206. The streaming 214 of the auxiliary computing environment 208 may also involve receiving input from the auxiliary device 206, such as user input, performance metrics detected by the auxiliary device 206, and data generated by the device properties 108 of the auxiliary device 206, for application to the auxiliary computing environment 208.

Additionally, the primary device 202 may also select, from the applications of the primary computing environment 204, an application set 210 to be presented on each auxiliary device 206. Such selection may involve the device type of the auxiliary device 206 (e.g., the form factor of the auxiliary device 206), the device properties 108 of the auxiliary device 206, and/or the intended use of the auxiliary device 206 by the user 102, such as selecting applications 206 that relate to the scenarios in which the user 102 intends to use the auxiliary device 206. The stream 214 to each auxiliary device 206 may include a presentation of the application set 210, e.g., as a list or menu. Additionally, for the respective auxiliary devices 206, the primary device 202 may execute applications 112 on behalf of the auxiliary device 206 (e.g., such applications 112 may utilize the processor, memory, and other computational capabilities of the primary device 202. When the primary device 202 receives a request to instantiate an application 112 for a particular auxiliary device 206, the primary device 202 may instantiate the application 112 on the primary device 202, and may insert the application 112 into auxiliary computing environment 208 (e.g., creating a user interface for the application 112 in the desktop space of the auxiliary computing environment 208; binding an input device to the user interface; and adding the application 112 to a running applications list 212 for the auxiliary computing environment 208). Moreover, the primary device 202 may adapt the execution of the application 112 to the device properties 108 of the particular auxiliary device 206; e.g., the user interface of the application 112 may be adapted to utilize the particular input capabilities, output capabilities, and other available components and resources of the auxiliary device 106. The stream 214 of the auxiliary computing environment 208 therefore includes the presentation of the application 112 within the auxiliary computing environment 208 transmitted to and presented by the device 106. In this manner, the primary device 202 may enable the presentation of the primary computing environment 204 to the user 102 through the auxiliary devices 206 of the device collection 104 in accordance with the techniques presented herein.

C. Technical Effects

The use of the techniques presented herein to present the primary computing environment 204 to the user 102 through the auxiliary devices 206 of the device collection 104 may, in some embodiments, result in a variety of technical effects.

As a first example of a technical effect that may be achievable by the techniques presented herein, if the applications 112 are executed on the primary device 202, the applications 112 may utilize a shared set of files 114, and are derived from a shared set of applications 112 installed on the primary device 202; e.g., installing and updating an application 112 on the primary device 202 enables the inclusion of the application 112 in the application set 210 for each auxiliary device 206. Moreover, the execution and compatibility of the application 112 does not depend on the particular architectural details of each auxiliary device 206 (e.g., the processor capacity and instruction set architecture of the auxiliary device 206), but only on the architectural details of the primary device 202. In this manner, the applications 112 and the primary computing environment 204 may be presented to the user 102 in a more consistent way, i.e., reducing differences in the presentation between such auxiliary devices 206 that are not intentional, but that are driven by architectural differences, incompatibility of computing components, or other such obstacles.

As a second example of a technical effect that may be achievable by the techniques presented herein, the presentation of the auxiliary computing environments 208 as an adaptation of the primary computing environment 202 may reduce the amount of configuration and maintenance to be performed by the user 102. For example, rather than acquiring, installing, and configuring an application 112 on each auxiliary device 206 of the device collection 104 where such application 112 is desired, the techniques presented herein enable the user 102 to install and configure the application 112 once on the primary device 202, and thereafter to access the application through the auxiliary computing environment 208 of any auxiliary device 206. Moreover, the techniques presented herein may enable a centralized administration of the device collection 104; e.g., the user 102 may adjust the auxiliary computing environments 208 of each auxiliary device 206 simply by adjusting the adaptation of the primary computing environment 204 by the primary device 202 for the selected auxiliary device 206. Such reduced administrative costs may facilitate the scalability of the device collection 104; e.g., the user 102 may be more apt to add auxiliary devices 206 to the device collection 104 if each such auxiliary device 206 does not have to be separately configured and maintained, but only by configuring the primary device 204 to provide additional auxiliary computing environments 208 for such additional auxiliary devices 206.

As a third example of a technical effect that may be achievable by the techniques presented herein, the auxiliary computing environments 208 and the execution of the applications 112 may be adapted to utilize the device properties 108 of the auxiliary device 206; e.g., an application 112 may provide a dynamic, animated user interface within the auxiliary computing environment 208 of an auxiliary device 206 with capacious network connectivity to the primary device 202 and a plentiful supply of power from a utility line, and may provide a simple, static user interface within the auxiliary computing environment 208 of an auxiliary device 206 with limited network connectivity to the primary device 202 and a limited supply of power from a battery. In this manner (and in contrast with terminal services scenarios), the presentation of the primary computing environment 204 may more fully utilize the device properties 108 of each auxiliary device 206, while reducing the amount of maintenance involved in the provision thereof.

As a fourth example of a technical effect that may be achievable by the techniques presented herein, the primary device 202 may enable a flexible execution of applications 112 among the auxiliary devices 206 of the device collection 104; e.g., the user interface for an application 112 may be distributed over a plurality of auxiliary devices 206, or may be readily moved from a first auxiliary device 206 to a second auxiliary device 206 in case the device collection 104 changes.

As a fifth example of a technical effect that may be achievable by the techniques presented herein, the interaction of applications 112 executed within the auxiliary computing environments 208 of multiple auxiliary devices 112 may interact easily, through an interprocess communication or file sharing mechanism within the primary device 202, rather than utilizing device and/or network interconnectivity between auxiliary devices 206. Such interactivity may facilitate the efficiency and/or ease of development and use of such interoperative applications 112. As one such example, the user 102 may use an input device attached to a first auxiliary device 206 in order to interact with an application 112 executing within the auxiliary computing environment 208 of a second auxiliary device 206.

As a sixth example of a technical effect that may be achievable by the techniques presented herein, the presentation of the primary computing environment 204 and the execution of the applications 112 on the primary device 202 may present an overall efficiency gain. For example, rather than using multiple auxiliary devices 206 (possibly a large number) to execute multiple instances of an application 112, the primary device 202 may be able to execute the application 112 on behalf of a large number of such auxiliary devices 206, e.g., reducing redundant execution of some computational processes across multiple auxiliary devices 206. For example, instead of each of several auxiliary devices 206 routinely polling a mail server for mail (thus resulting in a potentially high volume of email requests), the primary device 202 may periodically query the mail server, and upon receiving a new message, may transmit a notification through multiple auxiliary devices 206. Such efficiency gains may advantageously economize the computational resources (e.g., processor usage, storage, and network bandwidth), and may even reduce the aggregate maintenance and power costs of administrating the device collection 104.

As a seventh example of a technical effect that may be achievable by the techniques presented herein, a high-quality computing experience may be presented on a device collection 104 of comparatively low-powered auxiliary devices 206. For example, by transferring the computational burdens of rendering the auxiliary computing environment 208 and executing the applications 112 to the primary device 202, these techniques enable the presentation of a high-quality auxiliary computing environment 208 on an auxiliary device 206 that may not even have enough computational resources to render such an auxiliary computing environment 208 in a local context at the same quality level. Outdated hardware may therefore be incorporated into the device collection 104 without necessarily diminishing the quality of the computing environment presented therethrough. Additionally, the performance of the entire device collection 104 may be scaled up simply by scaling up the resources of the primary device 202; e.g., higher-quality renderings of the computing environment throughout the device collection 104 may be achievable by upgrading the processor and memory capacity of the primary device 202.

As an eighth example of a technical effect that may be achievable by the techniques presented herein, the use of the techniques presented herein may enable a user 102 to achieve a presentation of a primary computing environment 204 on a device collection 104 of auxiliary devices 206 that are not necessarily owned by the user 102 and/or regularly accessed by the primary device 202. For example, a publicly accessible computing workspace may comprise a collection of auxiliary devices 206 including displays, keyboards, speakers, and peripheral devices such as printers, which, upon interfacing with a primary device 202 of the user 102, enable the presentation of the primary computing environment 204 stored on the primary device 202. These and other technical effects may be achievable through various implementations of the techniques presented herein.

D. Example Embodiments

Figure 3:
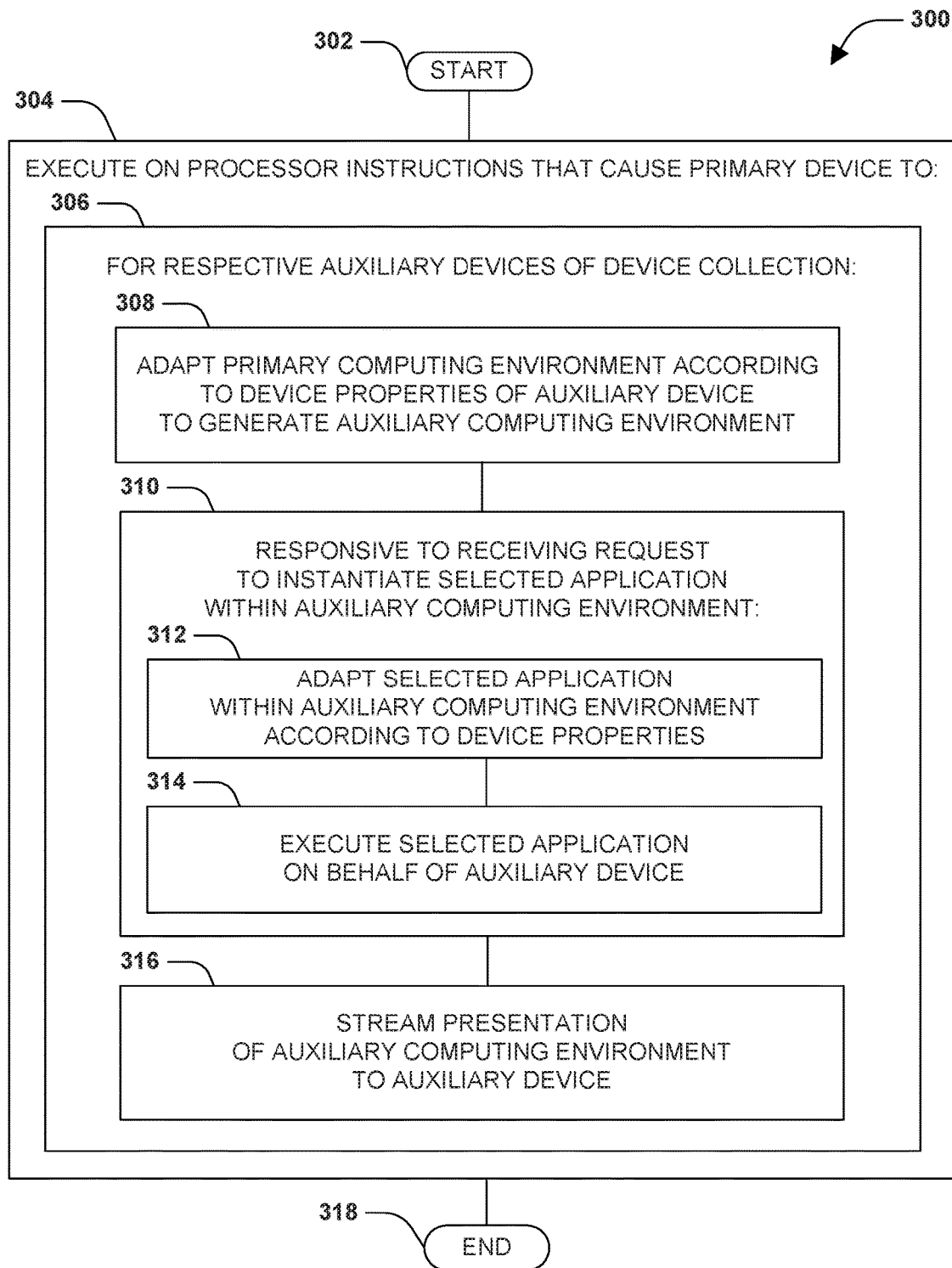
FIG. 3 is a flow diagram of an example method of enabling a primary device to present a computing environment on auxiliary devices of a device collection, in accordance with the techniques presented herein.

FIG. 3 presents a first example embodiment of the techniques presented herein, illustrated as an example method 300 of configuring a primary device 202 to present a primary computing environment 204 to a user 102 through auxiliary devices 206 of a device collection 104. The example method 300 may be implemented, e.g., as a set of instructions stored in a memory component of the primary device 202, such as a memory circuit, a platter of a hard disk drive, a solid-state storage device, or a magnetic or optical disc, and organized such that, when executed on a processor of the device, cause the primary device 202 to operate according to the techniques presented herein.

The example method 300 begins at 302 and involves executing 304 the instructions on a processor of the primary device 202. Specifically, executing 304 the instructions on the processor causes the primary device 202 to, for the respective 306 auxiliary devices 206 of the device collection 104, adapt 308 the primary computing environment 204 according to a set of device properties 108 of the auxiliary device 206, to generate an auxiliary computing environment 208 for the auxiliary device 206. Executing 304 the instructions on the processor further causes the primary device 202 to, responsive to receiving 310 a request to instantiate a selected application 112 within the auxiliary computing environment 208 of a respective 306 auxiliary device 206, adapt 312 the selected application 112 within the auxiliary computing environment 208 according to the device properties 108 of the auxiliary device 206, and execute 314 the selected application 112 on behalf of the auxiliary device 206. Executing 304 the instructions on the processor further causes the primary device 202 to stream 214 a presentation of the auxiliary computing environment 208 to the respective auxiliary device 206. In this manner, the instructions cause the primary device 202 to present the primary computing environment 204 to the user 102 through the auxiliary devices 206 of the device collection 104, and so ends at 318.

A second example embodiment of the techniques presented herein (not illustrated) involves an example method of configuring an auxiliary device 206 to present a primary computing environment 204 to a user 102 that has been transmitted by a primary device 202 of the device collection 104. An example method of achieving this effect may comprise, e.g., executing, on a processor of the auxiliary device 206, instructions that cause the auxiliary device 206 to transmit a set of device properties 108 of the auxiliary device 206 to the primary device 202; responsive to receiving a request to instantiate an application 112 within an auxiliary computing environment 208 of the auxiliary device 206, transmit the request to the primary device 202; and responsive to receiving from the primary device 202 a stream 2014 comprising a presentation of the auxiliary computing environment 208 including the application 112 executed by the primary device 202 and adapted according to the device properties 108 of the auxiliary device 206, presents the auxiliary computing environment 208 to the user 102. In this manner, the example method may enable the auxiliary device 206 to present the primary computing environment 204 to the user 102 in accordance with the techniques presented herein.

Figure 4:
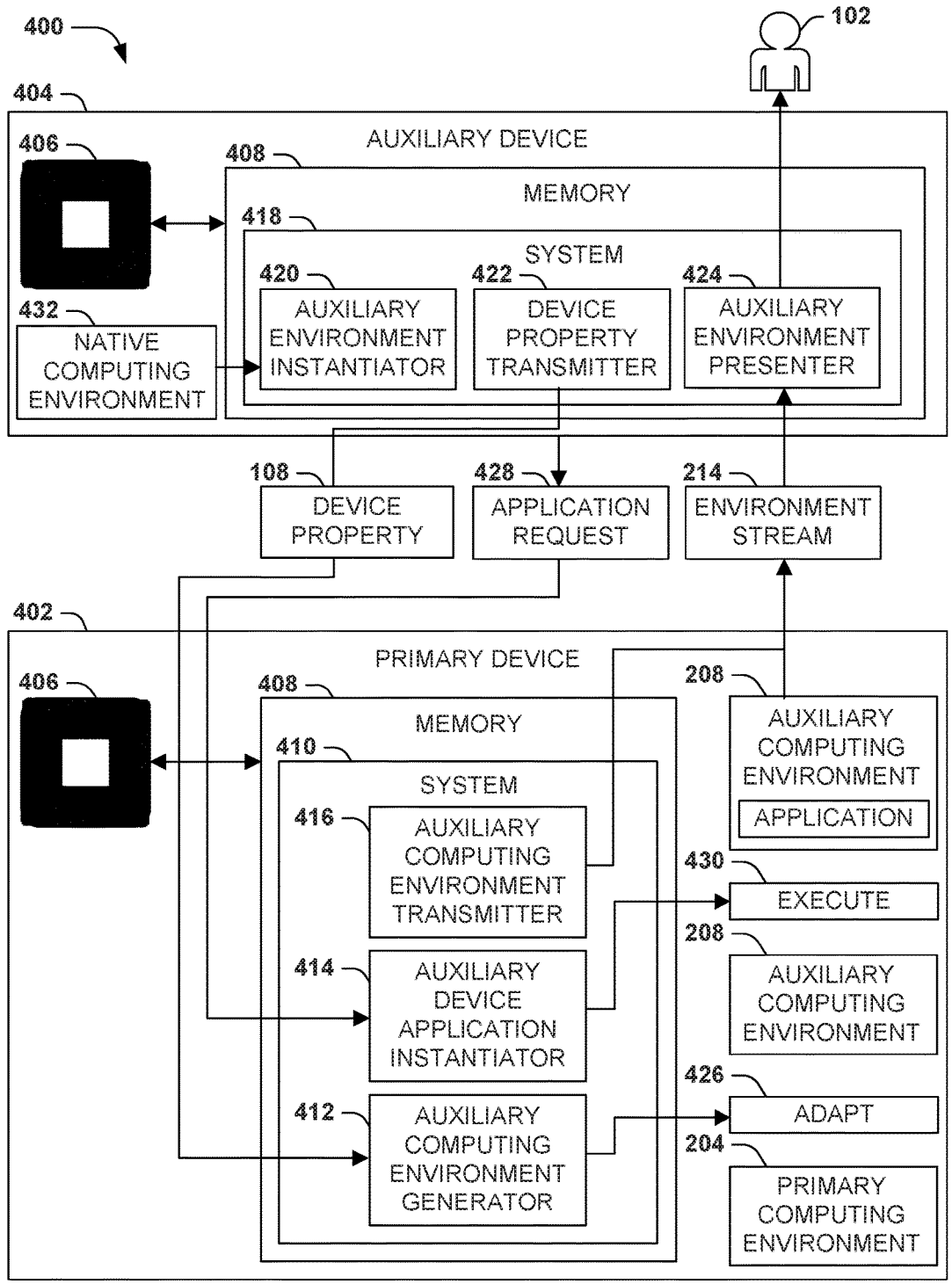
FIG. 4 is a component block diagram of example systems that enable a primary device and an auxiliary device of a device collection to present a computing environment to a user, in accordance with the techniques presented herein.

FIG. 4 presents further example embodiments of the techniques presented herein, illustrated as example systems respectively implemented on an example primary device 402 and an example auxiliary device 406 that implement at least a portion of the techniques presented herein. The example primary device 402 hosts and/or manages a primary computing environment 204 (e.g., a set of applications 112, application configurations, device drivers, files 114 such as documents and media objects, user accounts and credentials, and application states). The example auxiliary device 404 exhibits at least one device property 108 (e.g., a device type, hardware or software components and/or capabilities thereof, and/or circumstances in which the user 102 interacts with the example auxiliary device 404), and a native computing environment 432 that the example auxiliary device 404 typically presents when not receiving an auxiliary computing environment 208 from the example primary device 402. Further, in this exemplary scenario 400, each of the example primary device 402 and the example auxiliary device 404 includes a processor 406 and a memory 408 where an example system causes respective example device to present a computing environment to a user 102 in accordance with the techniques presented herein. The respective example systems may be implemented, e.g., as a set of components respectively comprising a set of instructions stored in the memory 408 of the respective example devices, where the instructions of respective components, when executed on the processor 406, cause the example device to operate in accordance with the techniques presented herein. Alternatively, the respective components may be implemented as a discrete circuit or hardware device, or a combination thereof, that operate in accordance with the techniques presented herein.

The example primary device 402 includes a first example system 410 comprising an auxiliary computing environment generator 412, which, for the example auxiliary device 404, adapts 426 the primary computing environment 204 according to the device properties 108 of the example auxiliary device 404 to generate an auxiliary computing environment 208 for the example auxiliary device 404. The first example system 410 further comprises an auxiliary device application instantiator 414, which, responsive to receiving a request 428 to instantiate a selected application 112 within the auxiliary computing environment 208 of the example auxiliary device 404, adapts the selected application 108 within the auxiliary computing environment 208 according to the device properties 108 of the example auxiliary device 404, and executes 430 the selected application 112 on behalf of the example auxiliary device 404. The first example system 410 further comprises an auxiliary computing environment transmitter 416, which streams 214 a presentation of the auxiliary computing environment 208 to the example auxiliary device 404.

The example auxiliary device 404 includes a second example system 418, comprising a device property transmitter 420, which transmits the set of device properties 108 of the example auxiliary device 404 to the example primary device 402. The second example system further comprises an auxiliary environment presenter 424, which, responsive to receiving from the example primary device 402 a stream 214 comprising a presentation of the auxiliary computing environment 208 that includes the application 112 executed by the example primary device 402 and adapted according to the device properties 108 of the example auxiliary device 404, presents the auxiliary computing environment 208 to the user 102. The auxiliary device 404 further comprises a native environment instantiator 420, which, responsive to receiving a request to present the auxiliary computing environment 208 on the example auxiliary device 404, transitions the example auxiliary device 404 from presenting the native computing environment 432 to presenting the auxiliary computing environment 208. In this manner, the interoperation of the example primary device 402 and the example auxiliary device 404 utilizing such example systems may enable a cooperative presentation of the computing environment to the user 102 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
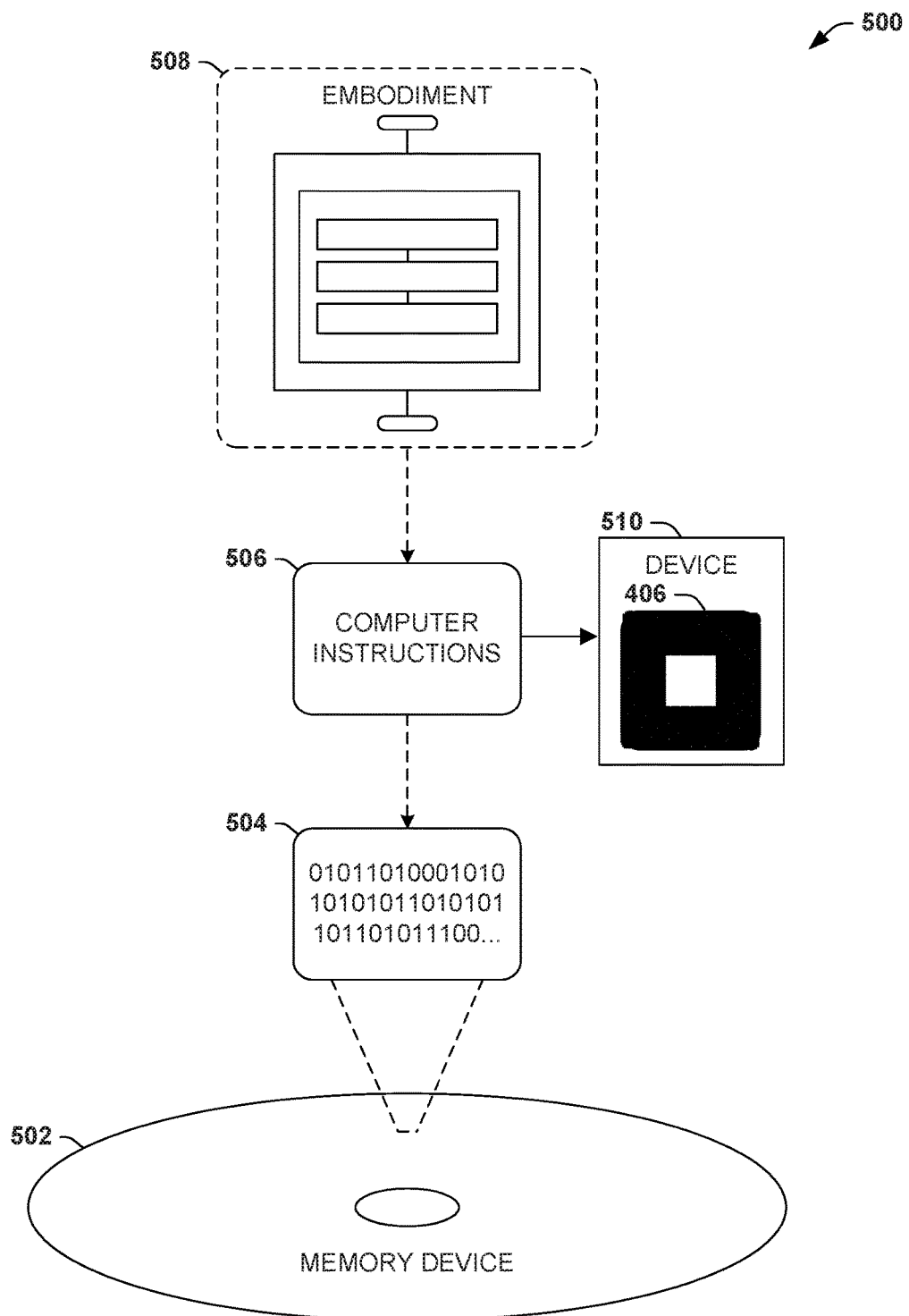
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 406 of a device 510, cause the device 510 to operate according to the principles set forth herein. In a first such embodiment, the processor-executable instructions 506 may cause a primary device 202 to present a computing environment to a user 102 through one or more auxiliary devices 206 of a device collection 104, such as the example method 300 of FIG. 3. In a third such embodiment, the processor-executable instructions 506 may cause a primary device 202 and/or an auxiliary device 206 to implement a system for presenting a computing environment to a user 102, such as the example systems presented in the example scenario 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example systems 410, 418 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 106 of a device collection 104, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with a variety of applications 112 presented within the auxiliary computing environments 208 of the respective auxiliary devices 206, such as office productivity applications; media presenting applications, such as audio and video players; communications applications, such as web browsers, email clients, chat clients, and voice over IP (VoIP) clients; navigation applications, such as geolocation, mapping, and routing applications; utilities, such as weather and news monitoring applications that present alerts to the user 102; and games.

Moreover, the applications 112 of the auxiliary computing environments 208 may involve a presentation of content through one or more presentation modalities, such as text, images, live and/or prerecorded video, sound effects, music, speech, tactile feedback, three-dimensional rendering, and interactive and/or non-interactive user interfaces, as well as various techniques for receiving user input from the user 102, such as text input, pointing input, tactile input, gestural input, verbal input, and gaze tracking input.

As a third variation of this first aspect, the techniques presented herein may be utilized with a variety of architectures within and/or among the devices 106 of the device collection 104. As a first such example, the primary device 202 may also be part of the device collection 104 (e.g., a mobile phone of the user 102), and may therefore also operate as an auxiliary device 206. The user 102 may designate various auxiliary devices 206 as the primary device 202 at different times and/or under different circumstances. Alternatively, the primary device 202 may be outside of the device collection 104, and may interact with the device collection 104 in order to drive the auxiliary computing environments 208 to the respective auxiliary device 108. As a second such example, the primary device 202 and/or the respective auxiliary devices 206 may utilize components that are directly and physically connected to each such device, such as wired displays, speakers, and headphones. As a third such example, the primary device 202 and/or the respective auxiliary devices 206 may utilize one more components that are accessible via a wireless connection, such as a radiofrequency. As a fourth such example, the primary device 202 and/or the respective auxiliary devices 206 may communicate over a personal-area, local-area, and/or wide-area network in order to interoperate according to the techniques presented herein. As a fifth such example, the primary device 202 and/or the respective auxiliary devices 206 may utilize one or more components that are accessible through another device of the device collection 104, such as in a client/server or peer-to-peer architecture. Moreover, the primary device 202 and/or respective auxiliary devices 206 of the device collection 104 may be utilized by one user 102 or by a group of users 102, and/or may be controlled by at least one first user 102 on behalf of at least one second user 102. These and other scenarios may be suitable for the presentation of a computing environment through the interoperation of the primary device 202 and the respective auxiliary devices 206 of a device collection 104 in accordance with the techniques presented herein.

E2. Generating and Transmitting Auxiliary Computing Environment

A second aspect that may vary among embodiments of the techniques presented herein relates to the manner in which the primary device 202 transmits the stream 214 comprising the auxiliary computing environment 208 to the respective auxiliary devices 206, and in which the respective auxiliary devices 206 presents the auxiliary computing environment 208 to the user 102.

As a first variation of this second aspect, many types of device properties 108 of the auxiliary device 206 may be identified and used to generate and adapt the auxiliary computing environment 208 and/or the applications 112 executed therein for the auxiliary device 206. As a first such example, the device properties 108 of the auxiliary device 206 may include the presence and functionality of various hardware components, such as the computational through-put, parallel processing support, and instruction set architectures of various processors and coprocessors; the capacity, speed, and volatility of memory and storage; the modality, sensitivity, and recognition capabilities of various input devices, such as keyboards, mice, touch-sensitive displays, microphones, and cameras; the, size, resolution, and responsiveness of various visual output devices; the volume and quality of various audio output devices; the throughput, latency, and buffer capacity of various communications devices; and the properties of various other peripheral devices, such as printers, scanners, and biometric sensors. As a second such example, the device properties 108 of the auxiliary device 206 may include computational capabilities that are partly or wholly achievable through software, such as encoding and/or decoding various forms of media; encrypting, compressing, decompressing, decrypting, and/or verifying various types of data; utilizing various instruction sets and virtual devices, such as through hardware and/or software emulation or the accessibility of various types of language parsing or translation resources; processing various types of graphics requests, such as three-dimensional graphics rendering; and applying various security measures, such as user authentication. As a third such example, the device properties 108 of the auxiliary device 206 may include the circumstances in which the auxiliary device 206 is used, such as the availability of power (e.g., the presence and operating status of a utility line, a battery, and an uninterruptible power supply (UPS)). As a fourth such example, the device properties 108 of the auxiliary device 206 may include interrelationships between the auxiliary device 108 and other devices, such as the accessibility of network-attached storage (NAS), and the role of the auxiliary device 206 in a network, such as its peer-to-peer, client/server, and/or superior-subordinate relationships with other devices. As a fifth such example, the device properties 108 of the auxiliary device 206 may include the context in which one or more users 102 interact with the auxiliary device 206, such as the public, private, and/or secured nature of the auxiliary device 206, and the tasks that a particular user 102 typically engages with the auxiliary device 206 to perform.

As a second variation of this second aspect, a primary device 202 may determine the device properties 108 of an auxiliary device 206 in a variety of ways. As a first such example, the auxiliary device 206 may detect various device properties of the auxiliary device 206, such as by querying and identifying each hardware component of the auxiliary device 206, and may transmit such information to the primary device 202. As a second such example, the auxiliary device 206 may comprise an auxiliary device identifier (e.g., a product number, model number, and/or serial number), and the primary device 202 and/or auxiliary device 206 may look up the device properties 108 of the auxiliary device 206 in a device catalog to identify the device properties 108 of such auxiliary device 206 associated with the auxiliary device identifier. As a third such example, the auxiliary device 206 and/or the primary device 202 may measure the operation of the auxiliary device 206 under particular operating conditions (e.g., evaluating the processing capacity and/or network capacity of the auxiliary device 206 under test conditions, or while in ordinary use). As a fourth such example, the auxiliary device 206 and/or the primary device 202 may predict and/or deduce the device properties 108 of the auxiliary device 206; e.g., the context in which a user 102 interacts with the auxiliary device 206 may be determined by deduction achieved by monitoring the tasks that are often performed with the auxiliary device 206. As a fifth such example, the auxiliary device 206 and/or the primary device 202 may receive information about the device properties 108 of the auxiliary device 206 from one or more users 102. As a sixth such example, the primary device 202 may poll the auxiliary device 206 for such information (e.g., upon receiving a request to instantiate an application 112 for an auxiliary device 206), and/or the auxiliary device 206 may push the information to the primary device 202 (e.g., as part of a request to join the device collection 104).

As a third variation of this second aspect, the primary device 402 may generate an auxiliary computing environment 208 adapted from the primary computing environment 204 in a number of ways. As a first such example, the primary device 202 may store the primary computing environment 204 as a template image, and may generate the auxiliary computing environment 208 as a clone of the primary computing environment 204 with adjustments applied in view of the device properties 108 of the auxiliary device 206. As a second such example, the primary device 202 may actively utilize the primary computing environment 204, and may generate, store, and apply a transform, such as a diff file, to generate the auxiliary computing environment 208 adapted for a particular auxiliary device 206. As a third such example, the primary computing environment 204 may comprise a superset of functionality available on all auxiliary devices 206 (e.g., a complete set of operating system and computing environment settings, applications 112, application configurations, application states, and user accounts), and the primary device 202 may select a subset of the functionality of the primary computing environment 204 as the auxiliary computing environment 208 of a particular auxiliary device 206. For example, a particular application 112 may be stored within the primary computing environment 204 as a set of application variants that are respectively adapted for various types of auxiliary devices 206 (e.g., a workstation-form-factor user interface; a large-display user interface; and small-display user interfaces for various mobile devices), and the primary device 202 may select the application variant that is suitable for presentation within the auxiliary computing environment 208 of each auxiliary device 206. Such techniques may enable a re-use of the resources of the primary device 202 (e.g., storing and using a single copy of a particular application or application library on behalf of a large number of auxiliary devices 206).

As a fourth variation of this second aspect, the primary device 202 may render and/or transmit a stream 214 of the auxiliary computing environment 208 to an auxiliary device 206 in a number of ways. As a first such example, the primary device 202 may receive an input stream from the auxiliary device 206, and/or may stream video and/or audio output to the auxiliary device 206. As a second such example, the primary device 202 may transmit to the auxiliary device 206 a stream of graphics primitive instructions, such as differential updates of a currently presented video frame to produce a next video frame in the stream 214. As a third such example, the primary device 202 may transmit a subordinate application to the auxiliary device 206 that may be executed thereupon to render part or all of the auxiliary computing environment 208 of the auxiliary device 206. As a fourth such example, the primary device 202 may multicast a stream 214 for a portion or an entirety of an auxiliary computing environment 208 to two or more auxiliary devices 206 for presentation thereupon. As a fifth such example, the primary device 202 may transmit a portion of the auxiliary computing environment 208 for a first auxiliary device 206 for retransmission to a second auxiliary device 206 that presents the auxiliary computing environment 208 to the user 102.

As a fifth variation of this second aspect, the primary device 202 may adapt the provision of the auxiliary computing environments 208 in order to provide an adequate user experience on the respective auxiliary devices 206. For example, the primary device 202 may have adequate computational resources to provide a suitably responsive user experience for a particular number of auxiliary devices 206, but if overloaded with too many auxiliary devices 206, the primary device 202 may exhibit diminished and unsatisfactory performance, such as lag and/or interruptions in the transmission of the stream 214 of auxiliary computing environments 208 for some auxiliary devices 206. Various techniques may be utilized to mitigate diminished and unsatisfactory quality of service. As a first such example, the primary device 202 may estimate a maximum auxiliary device count of auxiliary devices 206 that the primary device 202 is capable of driving in a concurrent manner (e.g., a maximum of six concurrently serviced auxiliary devices 206), and may constrain the auxiliary device count of auxiliary devices 206 comprising the device collection 104 to the maximum auxiliary device count. Such estimation may involve a variety of circumstances, such as an estimation of the maximum auxiliary device count of the auxiliary devices that the primary device 202 is capable of driving with a minimum user experience quality of the auxiliary computing environment 208 for the respective auxiliary devices 206 (e.g., ensuring that each auxiliary device 208 may consistently receive a stream 214 of no fewer than 20 frames per second). Such estimation may be informed, e.g., by measuring the achievable quality of service on the auxiliary devices 206 in various circumstances, and may adapt to reflect changing circumstances (e.g., expanding the maximum auxiliary device count if more plentiful processing and/or network capacity is provided). Many such configurations in the generation, presentation, and transmission of the auxiliary computing environment 208 to the auxiliary devices 206 may be utilized in accordance with the techniques presented herein.

E3. Instantiating and Executing Applications

A third aspect that may vary among embodiments of the techniques presented herein involves the manner of instantiating and/or executing an application 112 within the auxiliary computing environment 208 of an auxiliary device 206.

As a first variation of this third aspect, a request 428 to instantiate an application 112 within the auxiliary computing environment 208 according to a user selection by a user 102 of a particular auxiliary device 206. For example, for a particular auxiliary device 206, the primary device 202 may select, from an application set of the primary computing environment 204, an application subset of applications 112 to be presented within the auxiliary computing environment 208 of the for the auxiliary device 206. The primary device 202 may present the application subset within the auxiliary computing environment 208 to the auxiliary device 206 (e.g., as a list or menu of available applications 112), and may receive a selection of an application 112 from the application subset that is presented within the auxiliary computing environment 208 (e.g., receiving from a user 102 a user selection of an application 112 from the menu presented within the auxiliary computing environment 208 of the auxiliary device 206).

As a second variation of this third aspect, a request 428 may be received to instantiate an application 112 within a first auxiliary computing environment 208 of a first auxiliary device, wherein the request 428 is received from a user 102 of a second auxiliary device 206 of the device collection 104. Accordingly, the primary device 202 may fulfill the request 428 by instantiating the selected application 112 within the first auxiliary computing environment 208 of the first auxiliary device 206.

As a third variation of this third aspect, a user 102 of the device collection 104 may be initially presented with the entire collection of applications 112 that are executable through and/or on behalf of one or more auxiliary devices 206 of the device collection 104. When the user 102 provides a selection of a selected application of the application set, the user 102 may then be presented with a list of the auxiliary devices 206 that are capable of executing the application 112; and responsive for receiving a selection of a selected auxiliary device 206, the primary device 202 may instantiate the application 112 within the auxiliary computing environment 208 of the selected auxiliary device 206. As another such example, the user 102 may be initially presented with the list of auxiliary devices 206 comprising the device collection 104. Responsive to receiving a selection of a selected auxiliary device 208, the user may be presented with the application subset of applications 112 that are executable on the selected auxiliary device 208; and responsive to receiving a selection of a selected application 112 of the application subset, the primary device 202 may instantiate the selected application 112 within the auxiliary computing environment 208 of the selected auxiliary device 206.

As a fourth variation of this third aspect, a user 102 of the device collection 104 may override the selection of the application subset for a particular auxiliary device 206 (e.g., the set of recommended applications 112 for the auxiliary device 206). Responsive to receiving a request to present the entire application set of the primary computing environment 204 within the auxiliary computing environment 208 instead of only the application subset that has been selected for the auxiliary device 206, the user 102 may be presented with the entire application set. Upon receiving a selection of a selected application 112 for the auxiliary device 206 that is not within the application subset selected for the auxiliary device 206, the primary device 202 may nevertheless instantiate the selected application 112 within the auxiliary computing environment 208 of the selected auxiliary device 206.

As a fifth variation of this third aspect, the primary device 202 may automatically select an auxiliary device 206 of the device collection 104 in order to instantiate a selected application 112. For example, responsive to receiving, from the user 102, a request 428 to instantiate a selected application 112, but where the request 428 does not indicate a selected auxiliary device 208 of the device collection 104 for which the application 112 is to be executed within the auxiliary computing environment 208, the primary device 202 may identify, from among the device collection 104, at least one candidate auxiliary device 206 for which the device properties 108 of the candidate auxiliary device 206 are compatible with the selected application 112. The primary device 202 may then select a selected auxiliary device 206 from among the candidate auxiliary devices 206, and instantiate the selected application 112 within the auxiliary computing environment 208 of the selected auxiliary device 206.

Figure 6:
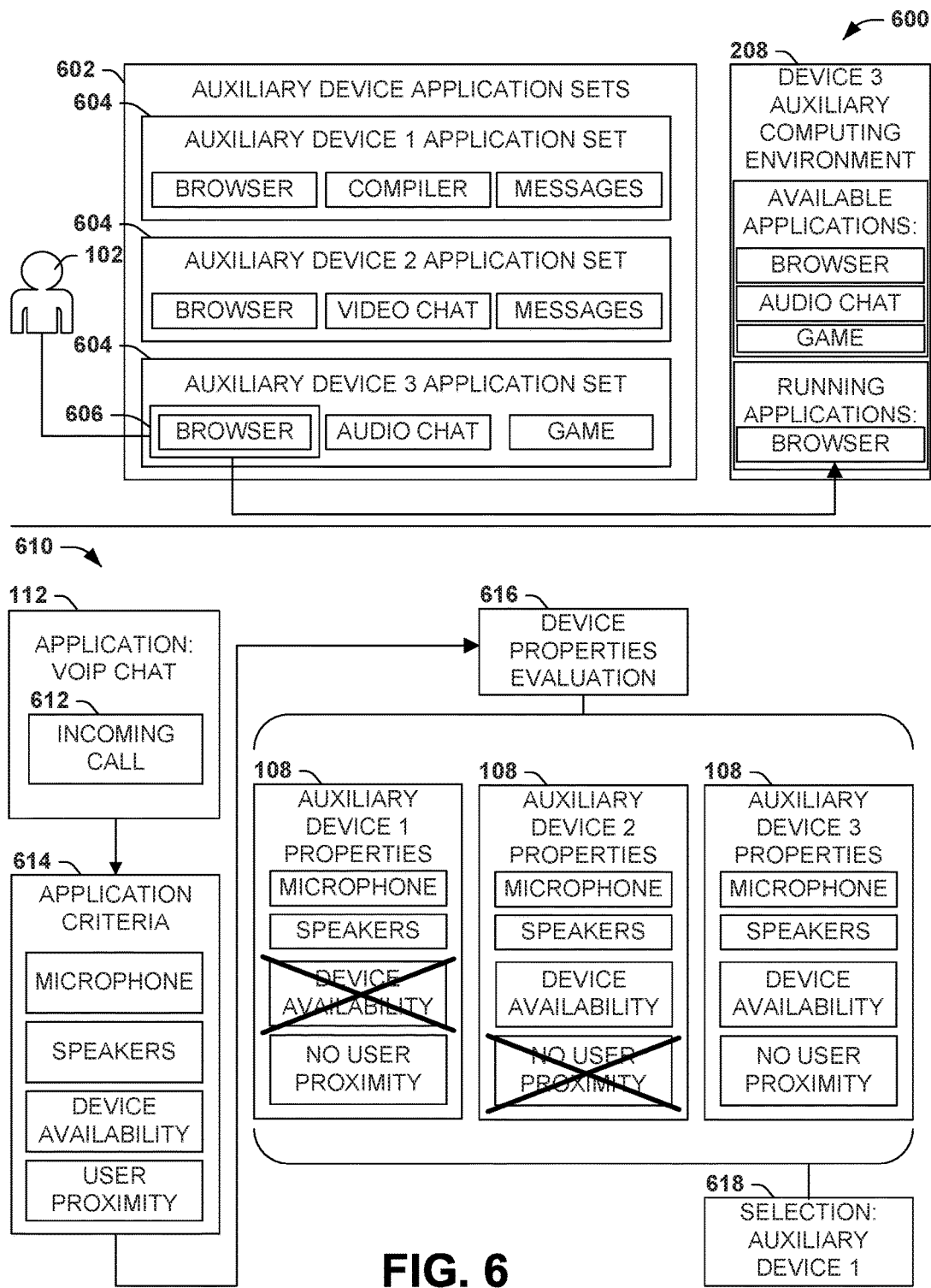
FIG. 6 is an illustration of an example scenario featuring various techniques for instantiating an application within a selected auxiliary device of a device collection, in accordance with the techniques presented herein.

FIG. 6 presents an illustration of example scenarios featuring additional technique for enabling the instantiation of applications 112 within the auxiliary computing environment 208 of a particular auxiliary device 206. In a first example scenario 600 of FIG. 6, the user 102 may be initially presented with a list of auxiliary device application sets 602, e.g., a list of the respective auxiliary devices 206 and the application subset 604 that is available on each auxiliary device 206. Upon receiving from the user 102 a selection 606 of a selected application 112 within the selected application subset 604 of a particular auxiliary device 206, the primary device 202 may instantiate the application 112 within the auxiliary computing environment 208 of the selected auxiliary device 206.

In a second example scenario 610 of FIG. 6, an application 112 such as a voice-over-IP (VoIP) application may be initiated by an event, such as an incoming call 612 that is to be presented to the user 102. The primary device 202 may react to the event by first evaluating various application criteria 614 of the application, such as the components and capabilities utilized by the application 112 (e.g., a microphone and speakers); criteria about the auxiliary device 206, such as the availability of the auxiliary device 108 to handle the event; and/or criteria about the user 102, such as the proximity of the user 102 to the auxiliary device 206. A device properties evaluation 616 may be performed to identify candidate auxiliary devices 206 that are compatible with the application criteria 614 of the application 112. For example, if the user 102 is utilizing a variety of auxiliary devices 206 while participating in a meeting, a first auxiliary device 206 may have a microphone and speaker, and may be in the proximity of the user 102, but may not be available to handle the event (e.g., the auxiliary device 206 may comprise a laptop computer that the user 102 is using to display a presentation during the meeting, or a phone that is present in the user's pocket, but for which the user 102 has activated a "do not disturb" option). A second auxiliary device 206 may also comprise a microphone and speakers, and may be available to handle the event, but may not be in the proximity of the user 102 (e.g., the auxiliary device 206 may comprise the user's workstation, which may be idle, but also located in the user's office while the user 102 is away at the meeting). A third auxiliary device 206 may exhibit device properties 108 matching the application criteria 614 (e.g., an earpiece worn by the user 102 during the meeting, which has the specified components, is proximate to the user 102, and is available to present the incoming call 612). The primary device 202 may therefore perform a selection 618 of the third auxiliary device 206 for the event (as the only candidate auxiliary device 206 of the device collection 104), and may route the incoming call 612 to the third auxiliary device for presentation to the user 102.

As a sixth variation of this third aspect, the primary device 202 may locally execute an entirety of the application 112 for the auxiliary computing environment 208 of a particular auxiliary device 206, and may transmit only images of the user interface to the auxiliary device 206. Alternatively, the primary device 202 may deploy some components of the application 112 to the auxiliary device 208 for use thereby. For example, the primary device 202 may comprise a first graphics coprocessor, and a particular auxiliary device 208 may comprise a second graphics coprocessor. In order to execute an application 112 on behalf of an auxiliary device 208, the primary device 202 may either render graphics for the application 112 on the first graphics coprocessor; may include in the stream 214 instructions to be delivered to the second graphics coprocessor of the auxiliary device 208 to render such graphics for inclusion in the application 112; and/a may utilize a combination thereof, wherein part of the graphics rendering is performed on the first graphics coprocessor and the rest is performed on the second graphics coprocessor. Such decisions may be determined, e.g., based on a comparison of the capabilities of each such graphics coprocessor, the current load of each graphics coprocessor (e.g., the primary device 202 may offload some processing if its graphics coprocessor is heavily utilized by other applications 112), and/or a comparison of the efficiency of each process (e.g., the achievable network throughput if sending a stream 214 of graphics instructions vs. sending partially or wholly rendered video). Other such variations in the distribution of the execution of applications 112 may include, e.g., configuring the primary device 202 to receive raw device input from the auxiliary device 206 (such as mouse movement) for application to the auxiliary computing environment 208, or configuring the auxiliary device 206 to perform some initial analysis of the user input and sending extrapolated results to the primary device 202 (such as pointer-related event messages) for application to the auxiliary computing environment 208; and providing some higher-level details of a user interface of the application 112 that are to be rendered by the auxiliary device 208 (such as sending an Extensible Application Markup Language ("XAML") document to the auxiliary device 208, and an instruction to render the user interface described therein within the auxiliary computing environment 208).

As a seventh variation of this third aspect, an application 112 to be instantiated within the device collection 104 may be distributed over two or more auxiliary devices 206. For example, according to the device properties 108 of a first auxiliary device 206 and a second auxiliary device 206, the application criteria 612 of the application 112 may be partitioned into a first application portion and a second application portion. For example, a video chat application 112 may be partitioned over a first auxiliary device 206 featuring a camera and microphone, wherein the input of the user 102 to the video chat session may be captured, and a second auxiliary device 206 featuring a display and speakers, wherein the user interface and output of the video chat session may be presented to the user 102. The first application portion may be instantiated within the first auxiliary computing environment 208 of the first auxiliary device 206 (and the stream 214 transmitted to the first auxiliary device 206 may include the first application portion and exclude the second application portion), and the second application portion may be instantiated within the second auxiliary computing environment 208 of the second auxiliary device 206. Since the primary device 202 is executing the application 112, the primary device 202 may coordinate the partitioning. Accordingly, the partitioning may occur even without informing the application 112, and/or even if the application 112 is not particularly configured to enable or support partitioning.

As an eighth variation of this third aspect, the primary device 202 may receive a request to receive user input on behalf of an application 112 executing within the auxiliary computing environment 208 of a first auxiliary device 206, and may fulfill such a request by binding the application 112 to an input component of a second auxiliary device 206. For example, the primary device 202 may receive such a request from an application 112 (e.g., a request to receive a particular type of user input that is not supported by the auxiliary device 206 for which the application 112 is executed), and/or from a user 102 (e.g., a request from the user 102 to bind an input component of a first auxiliary device 108 to an application 112 executing within the second auxiliary computing environment 208 of a second auxiliary device 206). In fulfillment of the request, the primary device 202 may identify, among the auxiliary devices 206 of the device collection 104, a selected auxiliary device 206 that exhibits device properties 108 that are compatible with the request. The primary device 202 may then bind the user input of the selected auxiliary device 206 to the application 112. Such identification and binding may occur and be achieved even if the application 112 is executing within the auxiliary computing environment 208 of a first auxiliary device 206, and the user input is bound to an input component of a second auxiliary device 206.

Figure 7:
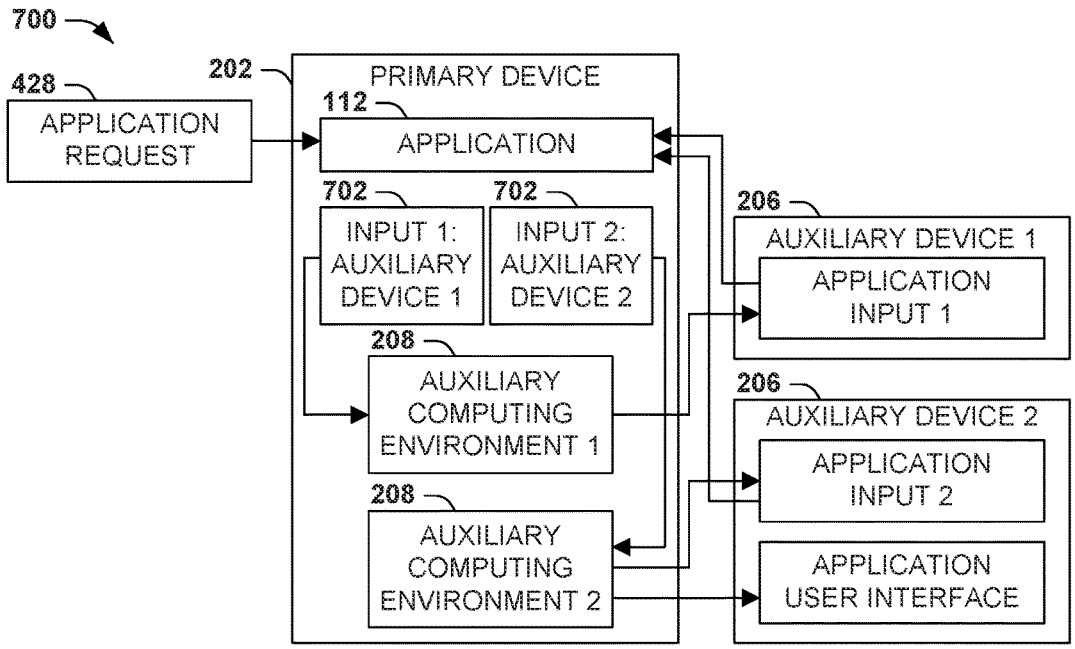
FIG. 7 is an illustration of an example scenario featuring a distribution of a user interface of an application over a set of selected auxiliary devices of a device collection, in accordance with the techniques presented herein.

FIG. 7 presents an illustration of an example scenario 700 featuring one such partitioning, wherein an application request 428 is fulfilled by partitioning the selected application 112 across multiple auxiliary device 206. In this example scenario 700, the primary device 202 receives the request 428 to instantiate a particular application 112 that may utilize at least two sources of user input 702 (e.g., two pointing devices, or a keyboard and a mouse, or a camera and a microphone). The primary device 202 may determine that a first auxiliary device 206 is capable of providing a first source of user input 702, and that a second auxiliary device 206 is capable of providing a second source of user input 702, as well as presenting an application user interface to the user 102. Accordingly, the primary device 202 may instantiate the application 112 and execute the application 112 locally, but may deploy, within a first auxiliary computing environment 208 of the first auxiliary device 206, a first source of user input 702 (e.g., reserving the use of a microphone that is positioned near the user 102), and, within a second auxiliary computing environment 208 of the second auxiliary device 206, a second source of user input 702 (e.g., reserving the use of a camera to capture images of the user 102, and also a display on which to present a user interface of the application 112). The primary device 202 may receive such user input 702 from each auxiliary device 206, may convey such user input 702 to the application 112, and may transmit the application user interface of the application 12 within the auxiliary computing environment 208 of the second auxiliary device 206.

Figure 8:
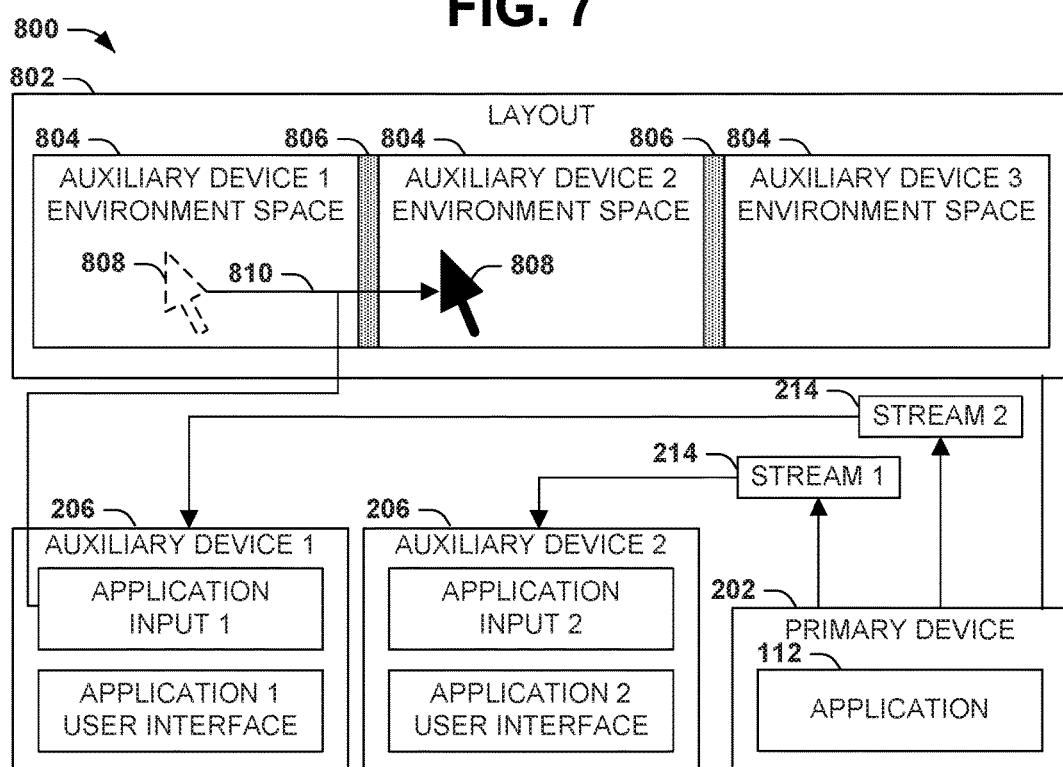
FIG. 8 is an illustration of an example scenario featuring a transition of an input of a first auxiliary device to a second auxiliary computing environment of a second auxiliary device, in accordance with the techniques presented herein.

FIG. 8 presents an illustration of an example scenario 800 featuring another such application of input binding among the auxiliary devices 206 of the device collection 104. In this example scenario 800, the respective auxiliary devices 206 may exhibit an environment space 804, such as a desktop environment or presentation region within which the respective auxiliary computing environments 208 and user interfaces of applications 112 may be presented. Moreover, the primary device 202 may arrange such environment spaces 804 in a layout 802, e.g., a spatial arrangement, orientation, and/or relationship of the input spaces 804 with respect to one another. Moreover, a first auxiliary device 206 may comprise an input component, and also an application user interface of a first application 112 that is executed by the primary device 202 on behalf of the first auxiliary device 206; and a second auxiliary device 206 may comprise an application user interface of a second application 112 that is executed by the primary device 202 on behalf of the second auxiliary device 206. The user 102 may manipulate the input component of the first auxiliary device 206 (e.g., providing pointer motion via mouse, touchpad, touch-sensitive display, gestures, and/or gaze tracking), and the primary device 202 may initially render a pointer 808 within the environment space 804 of the first auxiliary computing environment 208 of the first auxiliary device 206. However, a first environment space 804 of the first auxiliary computing environment 208 may be separated from a second environment space 804 of a second auxiliary computing environment 208 by a layout boundary 806, e.g., a border of each environment space 804 that is physically and/or conceptually adjacent to the other environment space 804 within the layout 802. The user 102 may request to transition the user input of the input component of the first auxiliary device 206 from the first environment space 804 to the second environment space 804, e.g., by initiating a transition 810 of the pointer 808 across the layout border 806 from the first environment space 804 into the second environment space 804. Responsive to the transition 810 of the pointer 808 across the layout border 806, the primary device 202 may bind the input component of the first auxiliary device 206 to the user interface of the application 112 executing within the auxiliary computing environment 208 of the second device 206.

As a ninth variation of this third aspect, a first auxiliary computing environment 208 may further comprise an instance of a first application 112, and a second auxiliary computing environment 208 may comprise an instance of a second application 112. The primary device 202 may enable communication between the first application 112 executing within the first auxiliary computing environment 208 and the second application 112 executing within the first auxiliary computing environment 208. Such interoperation may be readily achievable, e.g., through interprocess communication within the primary device 202 executing both applications 112, rather than as applications 112 executing on different auxiliary devices 206 that may intercommunicate through the more complex communication model of a network. Many such techniques may be utilized to instantiate and execute various applications 112 within the auxiliary computing environments 208 of the respective auxiliary device 206 in accordance with the techniques presented herein.

E4. Adapting Auxiliary Computing Environment and Applications for Auxiliary Device A fourth aspect that may vary among embodiments of the techniques presented herein involves the configuration of the primary device 202 to adapt an auxiliary computing environment 208 and/or the execution of an application 112 therein for a particular auxiliary device 206.

As a first variation of this fourth aspect, the adaptation of the auxiliary computing environment 208 may include a variety of settings and properties of the operating system. As a first such example, the adaptation may include user interface settings, such as the visual style, color scheme, font and icon styles and sizes, and input modalities of the auxiliary device 206. As a second such example, the adaptation may include the application set 210 of applications 112 that are to be presented to the user 102 within the auxiliary computing environment 208 of a particular auxiliary device 206 (e.g., a first set of applications 112 that are associated with a particular user context in which the user 102 interacts with the auxiliary device 206). As a third such example, such adaptation may also application configurations and/or modes of the applications 112 presented within the auxiliary computing environment 208 (e.g., determining that the user 102 utilizes applications 112 on a first auxiliary device 206 to interact with media objects in a creation or editing mode, but interacts with the same media objects a second auxiliary device 206 in a viewing or reading mode). As a fourth such example, the adaptation may include a selection of a set or subset of files 114 of the primary computing environment 204 that are provided within the auxiliary computing environment 208, such as documents and media objects (e.g., limiting the interaction of the user 102 with only a subset of the available documents and/or media objects). As a fifth such example, the adaptation may include a selection of user accounts provided within the primary computing environment 204 that are to be accessible within the auxiliary computing environment 208 of a particular auxiliary device 206 (e.g., a designation of the users 102 of a user set who are authorized to use a particular auxiliary device 206). As a sixth such example, the adaptation may include bookmark lists (e.g., determining that a user 102 frequently visits a first set of websites while interacting with a first auxiliary device 206, and frequently visits a second set of websites while interacting with a second auxiliary device 206).

As a second variation of this fourth aspect, the adaptation of the user interfaces of various applications 112 executing within the auxiliary computing environment 208 of a particular auxiliary device 206 may utilize, or not utilize, various device properties 108 of the respective auxiliary devices 206, or even of other auxiliary devices 206 of the device collection 104. For example, a first auxiliary device 206 and a second auxiliary device 206 may each feature a set of speakers for playing audio, but the primary device 202 may determine that the first auxiliary device 206 is used in a professional context (e.g., presenting a presentation to a client), during which interruption by audio alerts may be undesirable, and that the second auxiliary device 206 is used in a casual user context (e.g., at home), in which the user 102 is receptive to audio alerts. The primary device 202 may therefore adapt the auxiliary computing environment 208 transmitted to the first auxiliary device 206 to refrain from using the speakers, and may adapt the auxiliary computing environment 208 transmitted to the second auxiliary device 206 to utilize the speakers frequently for the presentation of audio alerts to the user 102.

As a third variation of this fourth aspect, the applications 112 executed within the auxiliary computing environments 208 of various auxiliary devices 206 may be adapted to interact with a user 102 through various presentation modalities. For example, the user 102 may prefer to interact with a first auxiliary device 206 (e.g., a workstation) using a full visual interface; with a second auxiliary device 206 (e.g., a mobile phone) using a condensed visual interface; and with a third auxiliary device 206 (e.g., a vehicle computer) using an audio-only interface. The auxiliary computing environments 208 of the respective auxiliary devices 206, and the applications 112 executed therein, may therefore be adapted to utilize the respective presentation modalities on each auxiliary device 206 (e.g., presenting a full-text version of an article with full images and video on the first auxiliary device 206; a summary text version of the article, with images and video removed, on the second auxiliary device 206; and an audio transcript of the article on the third auxiliary device 206).

As a fourth variation of this fourth aspect, the auxiliary computing environments 208 and applications 112 executed therein may be adapted to reflect the presence or absence, identities, and/or circumstances of other individuals with whom the user 102 interacts while utilizing the respective auxiliary devices 206. That is, the primary device 202 may determine, concurrent with and related to the user interaction of the user 102 with an auxiliary device 206, an individual interaction between the user 102 and a particular individual (e.g., that the user 102 frequently plays games with another individual on a home theater device). The primary device 202 may therefore provide, within the auxiliary computing environment 208 presented on the auxiliary device 206, an application 112 that is related to the individual interaction between the user 102 and the individual (e.g., presenting on the auxiliary device 206 a selection of two-player games that the user 102 and the individual may enjoy playing together). As another such example, the auxiliary computing environment 208 of an auxiliary device 206 may be adjusted to reflect the public and/or private nature of the use of the auxiliary device 206 by the user 102; e.g., a privately used auxiliary device 206 may present personal content of the user 102, such as cleartext versions of the user's password and personal photos, while a publicly used auxiliary device 206 may obscure the user's password and may refrain from presenting personal content.

As a fifth variation of this fourth aspect, the primary device 202 may achieve the adaptation of various settings and properties of the auxiliary computing environment 208 in a variety of ways. For example, the primary device 202 may transmit an application 112 to the auxiliary device 206 for execution with an application configuration that is suitable for the user context 108 of the user interaction of the user 102 with the auxiliary device 206. As one such example, for respective applications 112 that are to be presented within the auxiliary computing environment 208 on the respective auxiliary devices 206, the primary device 202 may store at least two application variants of the application 112, wherein respective application variants are associated with a selected user context 108 of the user interaction of the user 102 with an auxiliary device 206. The primary device 202 may therefore adapt the elements 422 of an application 112 within the auxiliary computing environment 208 for a particular auxiliary device 206 by identifying, among the at least two application variants, a selected application variant that is associated with the user context 108 of the user interaction of the user with the auxiliary device 206, and transmitting, to the auxiliary device 206, the auxiliary computing environment 208 comprising the selected application variant of the respective applications 112 presented in the auxiliary computing environment 208 of the auxiliary device 206.

As a sixth variation of this fourth aspect, the primary device 202 may adapt the architecture of the auxiliary computing environment 208 and/or applications 112 executed therein in view of various conditions. For example, the primary device 202 may initially select a first architecture for an application 112 or portion of the auxiliary computing environment 208 (e.g., executing the entirety of an application 112 on the primary device 202, and deploying only images of the user interface to the auxiliary device 206), but may later determine that a second architecture may achieve a higher-quality presentation of the auxiliary computing environment 208 (e.g., allocating some processing to the auxiliary device 206 in order to reduce latency or network transport).

As a seventh variation of this fourth aspect, the primary device 202 may permit a user 102 to reconfigure a first auxiliary device 206 to present view the auxiliary computing environment 208 of a second auxiliary device 206 (e.g., causing the first auxiliary device 206 to impersonate the second auxiliary device 206). For example, responsive to receiving a request to substitute the second auxiliary computing environment 208 for the first auxiliary computing environment 208 of the first auxiliary device 206, the primary device 202 may present the second auxiliary computing environment 208 on the first auxiliary device 206 instead of the first computing environment 208. Such presentation may be achieved, e.g., by multicasting the same stream 214 for the second auxiliary computing environment 208 to the first auxiliary device 206 as well as the second auxiliary device 206, and/or may be implemented in a temporary or persistent manner.

As an eighth variation of this fourth aspect, the primary device 202 may relocate applications 112 among the auxiliary computing environments 208 of the respective auxiliary devices 206. As a first such example, responsive to detecting an addition of a third auxiliary device 206 to the device collection 104, the primary device 202 may repartition at least one application 112 that is currently executing partially or entirely within a first auxiliary computing environment 208 of the first auxiliary device 206 to include the third auxiliary device 206 (e.g., partitioning a further portion of a first application portion of the application 112 initially executing on the first auxiliary device 206 onto the third auxiliary device 206, and/or entirely transferring the application portion from the first auxiliary device 206 to an added third auxiliary device 206 presenting a set of device properties 108 that is more suitable to the application 112). As a second such example, responsive to detecting a removal of an auxiliary device 206 from the device collection 104 (e.g., a temporary disconnection, or a persistent exclusion of the auxiliary device 206 from the device collection 104), the primary device 202 may move at least a portion of an application 112 presented within the first auxiliary computing environment 208 of the first auxiliary device 206 to a second auxiliary computing environment 208 of a second auxiliary device 206. Such applications 112 may later be transferred back to the first auxiliary device 206 if a connection is reestablished that once again admits the first auxiliary device 206 to the device collection 104.

Figure 9:
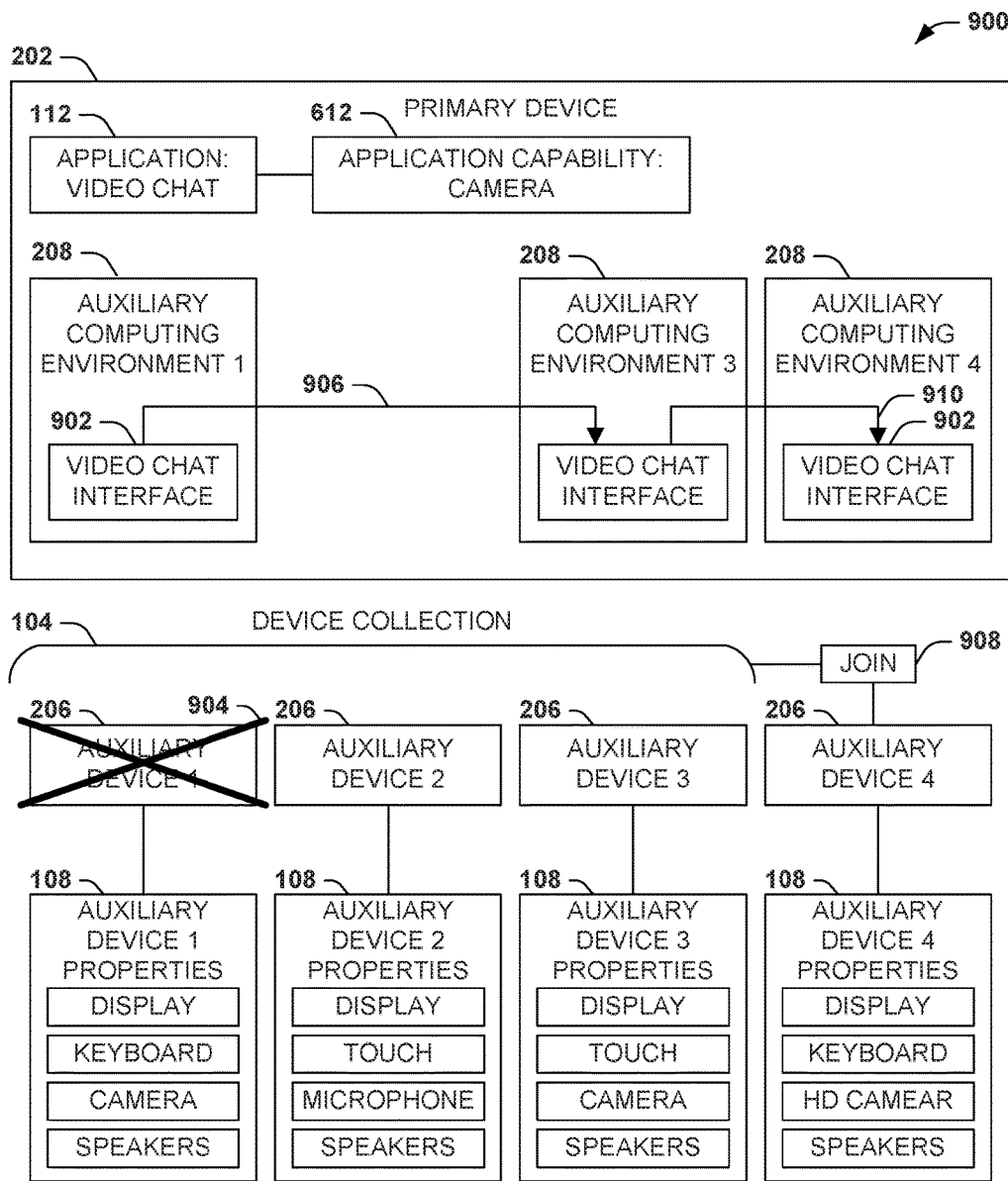
FIG. 9 is an illustration of an example scenario featuring a remapping of an application user interface among the auxiliary devices of a dynamic device collection, in accordance with the techniques presented herein.

FIG. 9 presents an illustration of an example scenario 900 featuring one such use of the variations of the techniques presented herein. In this example scenario 900, a primary device executes a video chat application 112 through a device collection 104 that initially comprises three auxiliary devices 206, and initially presents a video chat interface 902 on a first auxiliary device 206 featuring auxiliary device properties 108 that are adequate for the application 112. However, a remove 904 of the first auxiliary device 206 from the device collection 104 (e.g., a disconnection from a local area network) may cause the primary device 202 to seek a transfer of the video chat interface 902, e.g., in order to continue a current video chat session without interruption. The primary device 202 may therefore examine the auxiliary device properties 108 of the other auxiliary devices 206 of the device collection 104, and, upon determining that the second auxiliary device 206 is not suitable (e.g., because the device properties 108 do not include a camera) and that a third auxiliary device 206 is suitable (e.g., because the device properties 108 include a camera), may automatically transition 906 the video chat interface 902 from the first auxiliary computing environment 208 to a third auxiliary computing environment 208 of the third auxiliary device 206. Additionally, when a fourth auxiliary device 206 later joins 908 the device collection 104, the primary device 202 may examine the device properties 108 of the fourth auxiliary device 206, and may determine that the device properties 108 more fully facilitate the application 112 than the device properties 108 of the third auxiliary device 206 (e.g., the fourth auxiliary device 206 may provide a high-definition camera that enables a higher-quality video chat interface 902 than the camera of the third auxiliary device 206). Accordingly, the primary device 202 may initiate a second transfer 910 of the video chat interface 902 of the application 112 form the third auxiliary computing environment 208 to a fourth auxiliary computing environment 208 of the fourth auxiliary device 206 (optionally by presenting a recommendation to the user 102 first, and awaiting acceptance of the second transfer 910 before initiating such transfer). Many such techniques may be utilized to partition and/or adapt the execution of applications 112 among the auxiliary devices 206 of the device collection 104 in accordance with the techniques presented herein.

F. Computing Environment

Figure 10:
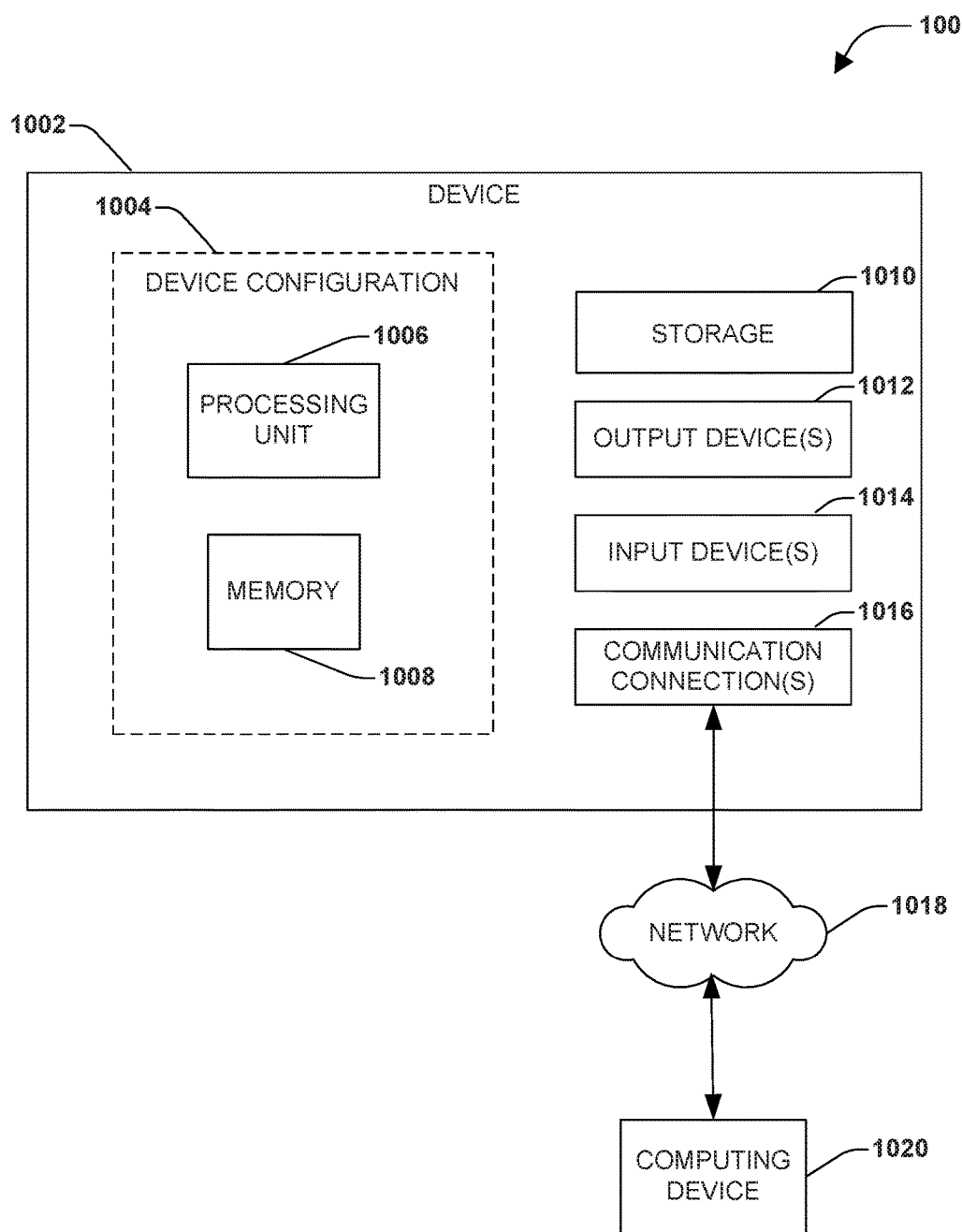
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring a primary device comprising a processor to present a primary computing environment to a user through a device collection, the method comprising:
   executing, on the processor, instructions that cause the primary device to:
      execute a set of applications on behalf of the device collection, wherein the set of applications executed by the primary device includes an instance of a first application that is executed on behalf of a first auxiliary device;
      fulfill a request to execute a second application for a second auxiliary device by inserting an instance of the second application into a running applications list; and
      stream, to the second auxiliary device, a presentation of an auxiliary computing environment that is adapted to a set of properties of the second auxiliary device, and that includes the instance of the second application while excluding the instance of the first application that is executed by the primary device on behalf of the first auxiliary device.

2. The method of claim 1, wherein the device collection further comprises:
   a first auxiliary device comprising a first auxiliary computing environment; and
   a second auxiliary device comprising a second auxiliary computing environment.

3. The method of claim 2, wherein executing the instructions further causes the primary device to, responsive to receiving a request to substitute the second auxiliary computing environment for the first auxiliary computing environment of the first auxiliary device, presenting the second auxiliary computing environment on the first auxiliary device instead of the first auxiliary computing environment.

4. The method of claim 2, wherein adapting a selected application within the first auxiliary computing environment of the first auxiliary device further comprises:
   according to the device properties of the first auxiliary device and the second auxiliary device, partition the selected application into a first application portion to be presented within the first auxiliary computing environment of the first auxiliary device and a second application portion to be presented within the second auxiliary computing environment of the second auxiliary device; and streaming the presentation of the first auxiliary computing environment to the first auxiliary device including only the first application portion and excluding the second application portion.

5. The method of claim 4, wherein executing the instructions on the processor further causes the primary device to, responsive to detecting an addition of a third auxiliary device to the device collection, repartition at least one application executing within the auxiliary computing environment of at least one auxiliary device to include the third auxiliary device.

6. The method of claim 2, wherein executing the instructions on the processor further causes the primary device to, responsive to detecting a removal of the first auxiliary device from the device collection, move at least a portion of an application presented within the first auxiliary computing environment of the first auxiliary device to the second auxiliary computing environment of the second auxiliary device.

7. The method of claim 2, wherein:
receiving the request to instantiate a selected application further comprises: responsive to receiving, from the user through the second auxiliary device, a request specifying the first auxiliary device for which to execute the selected application, execute the selected application within the first auxiliary computing environment of the first auxiliary device.

8. The method of claim 2, wherein:
the first auxiliary computing environment further comprises an instance of a first application;
the second auxiliary computing environment further comprises an instance of a second application; and
executing the instructions on the processor further causes the primary device to enable communication between the first application executing within the first auxiliary computing environment and the second application executing within the first auxiliary computing environment.

9. The method of claim 1, wherein:
the first auxiliary device further comprises an input component;
the second auxiliary computing environment further comprises an instance of a second application; and
executing the instructions on the processor further causes the primary device to, responsive to receiving a request from the user to bind the input component of the first auxiliary device to an application executing within the second auxiliary computing environment of the second auxiliary device, bind the input component of the first auxiliary device to the application.

10. The method of claim 9, wherein:
the first auxiliary device further comprises a first auxiliary computing environment sharing a layout boundary with the second auxiliary computing environment of the second auxiliary device; and
the request received from the user further comprises a transition of the user input of the input component across the layout boundary between the first auxiliary computing environment and the second auxiliary computing environment.

11. The method of claim 1, wherein:
generating the auxiliary computing environment for the respective auxiliary devices further comprises: selecting, from an application set of the primary computing environment, an application subset for the auxiliary device;

streaming the presentation of the auxiliary computing environment to the auxiliary device further comprises: presenting the application subset within the auxiliary computing environment to the auxiliary device; and
receiving the request to instantiate a selected application further comprises: receiving a selection of the selected application from the application subset presented within the auxiliary computing environment.

12. The method of claim 11, wherein receiving the request to instantiate a selected application further comprises:
initially presenting the device collection to the user;
responsive to receiving, from the user, a selection of a selected auxiliary device from the device collection, present the application subset for the auxiliary computing environment of the selected auxiliary device to the user; and
receiving, from the user, a selection of the selected application from the application subset for the selected auxiliary device.

13. The method of claim 11, wherein executing the instructions further causes the primary device to, responsive to receiving a request to present the application set within the auxiliary computing environment of the auxiliary device instead of the application subset, presenting the application set within the auxiliary computing environment of the auxiliary device instead of the application subset.

14. The method of claim 1, wherein receiving the request to instantiate a selected application further comprises:
responsive to receiving, from the user, a request to instantiate the selected application, where the request does not indicate a selected auxiliary device of the device collection:
identifying, among the device collection, at least one candidate auxiliary device for which the device properties are compatible with the selected application; and
selecting, from among the at least one candidate auxiliary device, a selected auxiliary device.

15. An auxiliary device of a device collection that collectively presents to a user a primary computing environment hosted by a primary device, the auxiliary device comprising:
a processor;
an output component; and
a memory storing instructions that, when executed by the processor, provide:
a primary device communicator that:
transmits, to the primary device, a request to execute a second application for the auxiliary device while the primary device concurrently executes a first application on behalf of another device of the device collection; and
an auxiliary computing environment presenter that:
receives, from the primary device, a stream of a presentation of the auxiliary computing environment that is adapted to a set of properties of the auxiliary device, and that includes the instance of the second application while excluding the instance of the first application that is executed by the primary device on behalf of the first auxiliary device; and
presents the auxiliary computing environment to the user through the output component.

16. A primary device that presents a primary computing environment to a user through a device collection, the primary device comprising:
a processor; and
a memory storing instructions that, when executed by the processor, cause the primary device to:

execute a set of applications on behalf of the device collection, wherein the set of applications executed by the primary device includes an instance of a first application that is executed on behalf of a first auxiliary device;

fulfill a request to execute a second application for a second auxiliary device by inserting an instance of the second application into a running applications list; and stream, to the second auxiliary device, a presentation of an auxiliary computing environment that is adapted to a set of properties of the second auxiliary device, and that includes the instance of the second application while excluding the instance of the first application that is executed by the primary device on behalf of the first auxiliary device.

17. The primary device of claim 16, wherein executing the instructions on the processor further causes the primary device to, responsive to receiving a request from an application requesting user input from the user:

identify, among the auxiliary devices of the device collection, a selected auxiliary device exhibiting device properties that are compatible with the request; and binding the user input of the selected auxiliary device to the application.

18. The primary device of claim 16, wherein executing the instructions on the processor further causes the primary device to, responsive to detecting an updated set of device properties of the auxiliary device, adjust the auxiliary computing environment to adapt to the updated set of device properties of the auxiliary device.

19. The primary device of claim 16, wherein executing the instructions on the processor further causes the primary device to:

estimate a maximum auxiliary device count of auxiliary devices that the primary device is capable of driving; and constraining the device collection to an auxiliary device count of auxiliary devices that is within the maximum auxiliary device count.

20. The primary device of claim 19, wherein estimating the maximum auxiliary device count further comprises: estimating the maximum auxiliary device count of the auxiliary devices that the primary device is capable of driving with a minimum user experience quality of the auxiliary computing environment for the respective auxiliary devices.

* * * * *